US012266216B2

(12) United States Patent
Mori et al.

(10) Patent No.: US 12,266,216 B2
(45) Date of Patent: Apr. 1, 2025

(54) PHOTOGRAPHING CONTROL DEVICE, SYSTEM, METHOD, AND NON-TRANSITORY COMPUTER-READABLE MEDIUM STORING PROGRAM

(71) Applicant: NEC Corporation, Tokyo (JP)

(72) Inventors: Yusuke Mori, Tokyo (JP); Takeshi Yamaguchi, Tokyo (JP); Honami Yuki, Tokyo (JP); Shuuji Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 420 days.

(21) Appl. No.: 17/800,717

(22) PCT Filed: Feb. 28, 2020

(86) PCT No.: PCT/JP2020/008204
§ 371 (c)(1),
(2) Date: Aug. 18, 2022

(87) PCT Pub. No.: WO2021/171528
PCT Pub. Date: Sep. 2, 2021

(65) Prior Publication Data
US 2023/0084625 A1    Mar. 16, 2023

(51) Int. Cl.
G06V 40/16    (2022.01)
G06V 10/98    (2022.01)
G06V 40/50    (2022.01)

(52) U.S. Cl.
CPC ............ *G06V 40/172* (2022.01); *G06V 10/98* (2022.01); *G06V 40/161* (2022.01); *G06V 40/50* (2022.01)

(58) Field of Classification Search
CPC .. G06V 40/165; G06V 10/774; G06V 40/174; G06F 18/214
See application file for complete search history.

(56) References Cited

U.S. PATENT DOCUMENTS 7,853,086 B2 * 12/2010 Kitamura ............... G06V 10/98
382/118
9,338,622 B2 * 5/2016 Bjontegard ........... A63F 13/216
(Continued)

FOREIGN PATENT DOCUMENTS

JP    2004-062560 A    2/2004
JP    2008-181303 A    8/2008
(Continued)

OTHER PUBLICATIONS

International Search Report for PCT Application No. PCT/JP2020/008204, mailed on Aug. 25.2020.

*Primary Examiner* — Yosef Kassa
(74) *Attorney, Agent, or Firm* — Sughrue Mion, PLLC

(57) ABSTRACT

A photographing control device includes a storage unit that stores identification information of a plurality of persons as a group, an acquiring unit that acquires a photographed image obtained by a predetermined photographing device and capturing multiple persons, a region identifying unit that identifies a plurality of facial regions from the photographed image, an individual authentication controlling unit that causes an authentication device storing a set of facial feature information items of the plurality of persons to perform facial authentication of each of the identified facial regions by use of the set of facial feature information items, and an output unit that outputs the photographed image as an output image if facial authentication of each of the facial feature information items of the respective persons belonging to the group has succeeded with regard to any one of the plurality of facial regions.

9 Claims, 21 Drawing Sheets

(56)  References Cited

U.S. PATENT DOCUMENTS

| | | | |
|---|---|---|---|
| 9,443,307 B2 * | 9/2016 | Anderson | ................. G06T 7/70 |
| 9,639,740 B2 * | 5/2017 | Ganong | ............. G06Q 30/0241 |
| 9,930,269 B2 * | 3/2018 | Kim | .................... H04N 5/2628 |
| 2004/0081338 A1 | 4/2004 | Takenaka | |
| 2020/0120285 A1 | 4/2020 | Kawase | |

FOREIGN PATENT DOCUMENTS

| | | |
|---|---|---|
| JP | 2011-182028 A | 9/2011 |
| JP | 2015-043141 A | 3/2015 |
| JP | 2016-126414 A | 7/2016 |
| JP | 2017-175453 A | 9/2017 |
| JP | 2018-085085 A | 5/2018 |
| WO | 2018/235318 A1 | 12/2018 |

* cited by examiner

PHOTOGRAPHING CONTROL DEVICE, SYSTEM, METHOD, AND NON-TRANSITORY COMPUTER-READABLE MEDIUM STORING PROGRAM

This application is a National Stage Entry of PCT/JP2020/008204 filed on Feb. 28, 2020, the contents of all of which are incorporated herein by reference, in their entirety.

TECHNICAL FIELD

The present invention relates to photographing control devices, systems, methods, and non-transitory computer-readable media storing programs and relates, in particular, to a photographing control device, a system, a method, and a non-transitory computer-readable medium storing a program each for performing facial authentication in a group.

BACKGROUND ART

Patent Literature 1 discloses a technique of taking a commemorative photograph by use of facial authentication technology. The facial authentication system described in Patent Literature 1 performs a facial comparison between a facial image included in an in-area image photographed within a recreational facility and a registration image registered at a lodging facility. The facial authentication system described in Patent Literature 1 allows each guest to obtain an in-area image that includes himself or herself.

Meanwhile, Patent Literatures 2 and 3 disclose a technique of detecting a facial image from a photographed image and adding mosaic to a facial image of a person other than a specific person. Patent Literature 4 discloses a technique of recognizing a gesture of a subject in a photographed image.

CITATION LIST

Patent Literature

Patent Literature 1: Japanese Unexamined Patent Application Publication No. 2016-126414
Patent Literature 2: Japanese Unexamined Patent Application Publication No. 2004-062560
Patent Literature 3: Japanese Unexamined Patent Application Publication No. 2011-182028
Patent Literature 4: Japanese Unexamined Patent Application Publication No. 2015-043141

SUMMARY OF INVENTION

Technical Problem

The system described in Patent Literature 1 outputs a photographed image including a registered person as an output image. However, if users are acting in a group, some of the group members may not be captured in an output image. This disadvantageously makes it difficult to take a group picture with the use of a related system.

The present disclosure has been made to solve such a problem and is directed to providing a photographing control device, a system, a method, and a program for providing a photographed image with an assurance that all the group members are captured in that photographed image.

Solution to Problem

A photographing control device according to the present disclosure includes: storing means for storing identification information of a plurality of persons as a group; acquiring means for acquiring a photographed image obtained by a predetermined photographing device and capturing multiple persons; region identifying means for identifying a plurality of facial regions from the photographed image; individual authentication controlling means for causing an authentication device storing a set of facial feature information items of the plurality of persons to perform facial authentication of each of the identified facial regions by use of the set of facial feature information items; and output means for outputting the photographed image as an output image if facial authentication of each of the facial feature information items of the respective persons belonging to the group has succeeded with regard to any one of the plurality of facial regions.

A photographing control device according to the present disclosure includes: storing means for storing a set of facial feature information items of a plurality of persons as a group; acquiring means for acquiring a photographed image obtained by a predetermined photographing device and capturing multiple persons; region identifying means for identifying a plurality of facial regions from the photographed image; individual authentication controlling means for performing facial authentication of each of the identified facial regions by use of the set of facial feature information items; and output means for outputting the photographed image as an output image if facial authentication of each of the facial feature information items of the respective persons belonging to the group has succeeded with regard to any one of the plurality of facial regions.

A photographing control system according to the present disclosure includes: a photographing control device including storing means configured to store identification information of a plurality of persons as a group; an authentication device including storing means configured to store facial feature information items of the plurality of persons and authenticating means configured to perform facial authentication by use of a set of the facial feature information items; and a predetermined photographing device, wherein the photographing control device is configured to acquire a photographed image obtained by the predetermined photographing device and capturing multiple persons, identify a plurality of facial regions from the photographed image, cause facial authentication of each of the identified facial regions to be performed by use of the set of facial feature information items, and output the photographed image as an output image if facial authentication of each of the facial feature information items of the respective persons belonging to the group has succeeded with regard to any one of the plurality of facial regions.

A photographing control method according to the present disclosure executed by a computer storing identification information of a plurality of persons as a group includes: acquiring a photographed image obtained by a predetermined photographing device and capturing multiple persons; identifying a plurality of facial regions from the photographed image; causing an authentication device storing a set of facial feature information items of the plurality of persons to perform facial authentication of each of the identified facial regions by use of the set of facial feature information items; and outputting the photographed image as an output image if facial authentication of each of the facial feature information items of the respective persons belonging to the group has succeeded with regard to any one of the plurality of facial regions.

A photographing control method according to the present disclosure executed by a computer storing a set of facial feature information items of a plurality of persons as a group includes: acquiring a photographed image obtained by a predetermined photographing device and capturing multiple persons; identifying a plurality of facial regions from the photographed image; performing facial authentication of each of the identified facial regions by use of the set of facial feature information items; and outputting the photographed image as an output image if facial authentication of each of the facial feature information items of the respective persons belonging to the group has succeeded with regard to any one of the plurality of facial regions.

A non-transitory computer-readable medium according to the present disclosure has a program recorded thereon, the program causing a computer storing identification information of a plurality of persons as a group to execute: a process of acquiring a photographed image obtained by a predetermined photographing device and capturing multiple persons; a process of identifying a plurality of facial regions from the photographed image; a process of causing an authentication device storing a set of facial feature information items of the plurality of persons to perform facial authentication of each of the identified facial regions by use of the set of facial feature information items; and a process of outputting the photographed image as an output image if facial authentication of each of the facial feature information items of the respective persons belonging to the group has succeeded with regard to any one of the plurality of facial regions.

A non-transitory computer-readable medium according to the present disclosure has a program recorded thereon, the program causing a computer storing a set of facial feature information items of a plurality of persons as a group to execute: a process of acquiring a photographed image obtained by a predetermined photographing device and capturing multiple persons; a process of identifying a plurality of facial regions from the photographed image; a process of performing facial authentication of each of the identified facial regions by use of the set of facial feature information items; and a process of outputting the photographed image as an output image if facial authentication of each of the facial feature information items of the respective persons belonging to the group has succeeded with regard to any one of the plurality of facial regions.

Advantageous Effects of Invention

The present disclosure can provide a photographing control device, a system, a method, and a program for providing a photographed image with an assurance that all the group members are captured in that photographed image.

EXAMPLE EMBODIMENT

Figure 1:
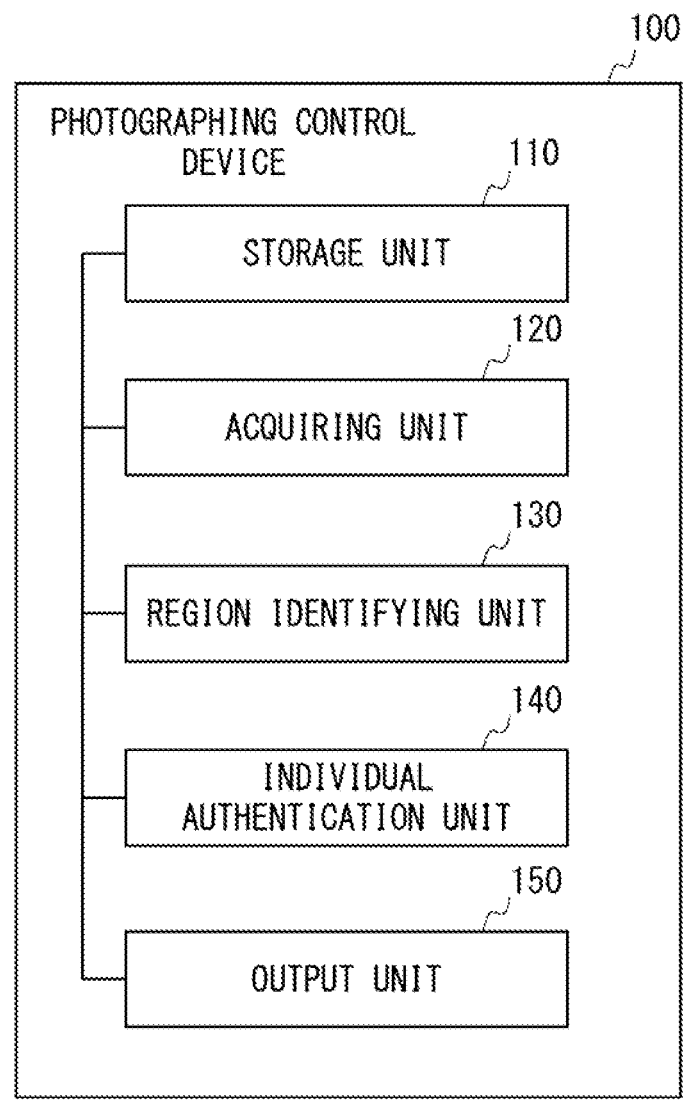
FIG. 1 is a block diagram illustrating a configuration of a photographing control device according to a first example embodiment.

Hereinafter, some example embodiments of the present disclosure will be described in detail with reference to the drawings.

In the drawings, identical or corresponding elements are given identical reference characters, and duplicate descriptions thereof will be omitted as necessary in order to make the description clearer.

First Example Embodiment

FIG. 1 is a block diagram illustrating a configuration of a photographing control device 100 according to a first example embodiment. The photographing control device 100 includes a storage unit 110, an acquiring unit 120, a region identifying unit 130, an individual authentication controlling unit 140, and an output unit 150. The photographing control device 100 is connected to a network 500 (not illustrated). The network 500 may be a wired network or a wireless network. An authentication device 200 (not illustrated) is connected to the network 500.

The storage unit 110 stores identification information of a plurality of persons of a group. The identification information is information for identifying a plurality of users. The identification information includes, for example but not limited to, a user ID or an email address. The acquiring unit 120 acquires a photographed image obtained by a predetermined photographing device and capturing multiple persons. The predetermined photographing device is, for example, a public camera installed in a public area.

The region identifying unit 130 identifies a plurality of facial regions from the photographed image. The individual authentication controlling unit 140 causes the authentication device 200 to perform facial authentication of each of the identified facial regions by use of a set of facial feature information items. In this example, the authentication device 200 stores the set of facial feature information of the plurality of persons.

The output unit 150 outputs the photographed image as an output image if the facial authentication of each of the facial feature information items of the respective persons belonging to the group has succeeded with regard to any one of the plurality of facial regions. The output unit 150 may output the output image to, for example, a user terminal owned by a person belonging to the group.

Figure 2:
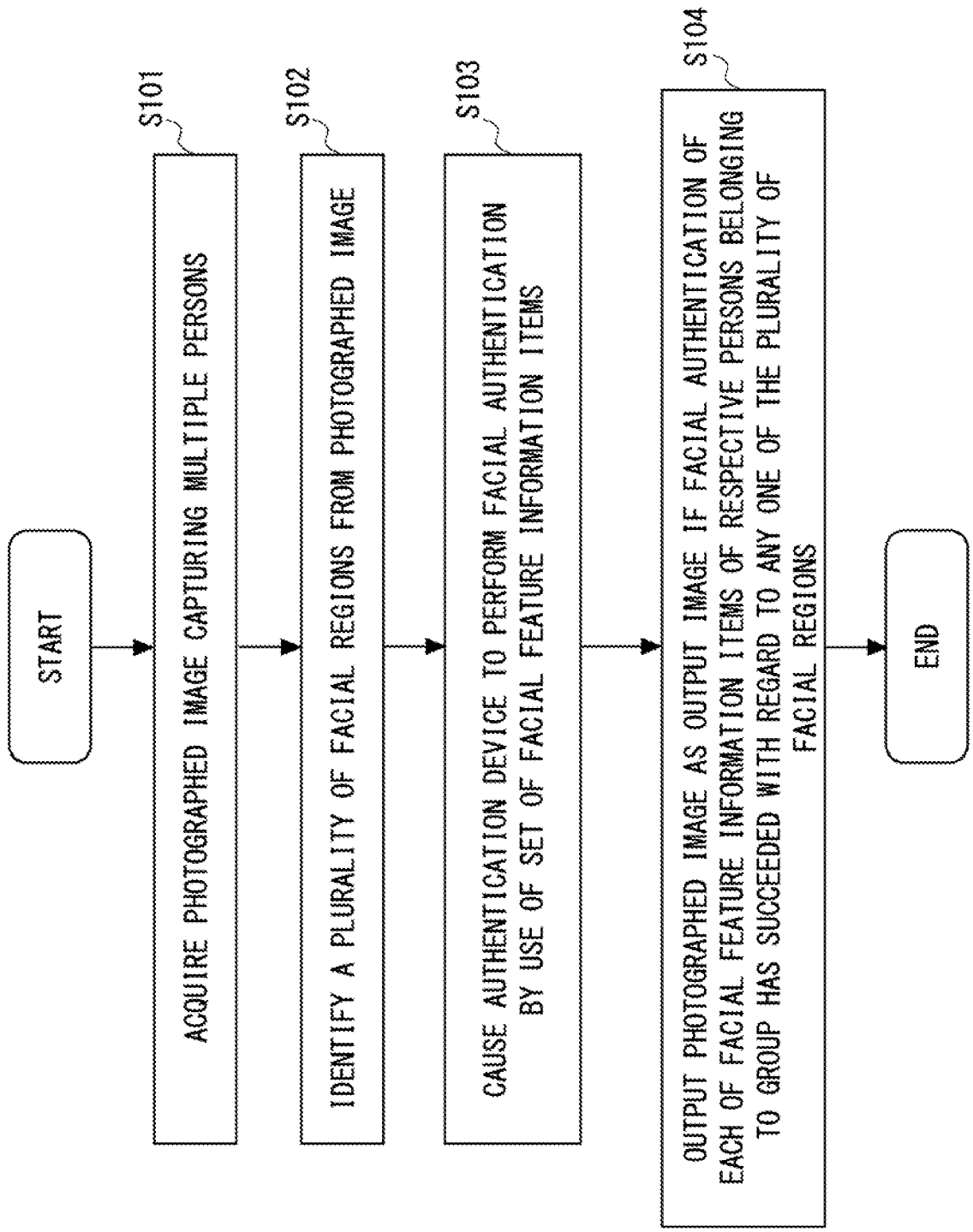
FIG. 2 is a flowchart illustrating a flow of a photographing control method according to the first example embodiment.

FIG. 2 is a flowchart illustrating a flow of a photographing control method according to the first example embodiment. Herein, the storage unit 110 of the photographing control device 100 stores identification information items of a plurality of persons of a group.

First, the acquiring unit 120 acquires a photographed image obtained by a predetermined photographing device and capturing multiple persons (step S101). The photographed image may include a person outside the group. All the members of the group need to be in the photographed image, in which some of the persons within the group may be located apart from each other. Next, the region identifying unit 130 identifies a plurality of facial regions from the photographed image (step S102).

Next, the individual authentication controlling unit 140 causes the authentication device 200, which stores a set of facial feature information items of the plurality of persons, to perform facial authentication of each of the identified facial region by use of the set of facial feature information items (step S103). Lastly, the output unit 150 outputs the photographed image as an output image if the facial authentication of each of the facial feature information items of the respective persons belonging to the group has succeed with regard to any one of the plurality of facial regions (step S104).

As described above, conventional techniques have not been able to provide an assurance that a photographed image includes all the group members. In contrast, the present example embodiment can provide a photographed image with an assurance that all the group members are captured in that photographed image.

Herein, the photographing control device 100 includes, as its components, a processor, a memory, and a storage device (none illustrated). The storage device stores a computer program that implements the processes of the photographing control method according to the present example embodiment. The processor loads the computer program from the storage device onto the memory and executes the computer program. Thus, the processor implements the functions of the acquiring unit 120, the region identifying unit 130, the individual authentication controlling unit 140, and the output unit 150.

Alternatively, the acquiring unit 120, the region identifying unit 130, the individual authentication controlling unit 140, and the output unit 150 may each be implemented by a dedicated piece of hardware. A part or the whole of the constituent elements of each device may be implemented by, for example, general-purpose or dedicated circuitry, a processor, or a combination thereof. Such constituent elements may be formed by a single chip or by a plurality of chips connected via a bus. A part or the whole of the constituent elements of each device may be implemented by a combination of the above-described circuitry or the like and a program. For the processor, a central processing unit (CPU), a graphics processing unit (GPU), a field-programmable gate array (FPGA), or the like can be used.

In a case where a part or the whole of the constituent elements of the photographing control device 100 is implemented by a plurality of information processing devices, circuitries, or the like, these information processing devices, circuitries, or the like may be disposed centrally or distributedly. For example, these information processing devices, circuitries, or the like may be implemented in a mode in which they are connected to each other via a communication network, as in, for example, a client server system or a cloud computing system. The function of the photographing control device 100 may be provided in a Software as a Service (SaaS) format.

Second Example Embodiment

A second example embodiment is a modification example of the first example embodiment described above. The photographing control device 100 according to the first example embodiment performs individual authentication by the external authentication device 200. In contrast, a photographing control device 100 according to the second example embodiment performs individual authentication within the device.

Figure 3:
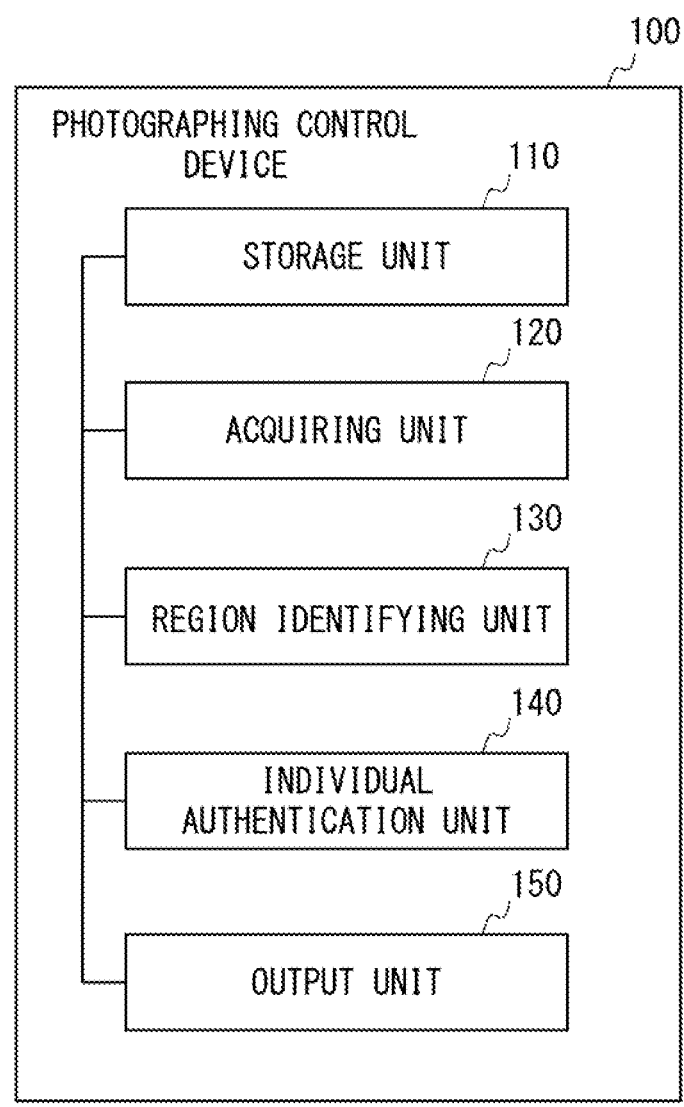
FIG. 3 is a block diagram illustrating a configuration of a photographing control device according to a second example embodiment.

FIG. 3 is a block diagram illustrating a configuration of the photographing control device 100 according to the second example embodiment. The photographing control device 100 includes a storage unit 110, an acquiring unit 120, a region identifying unit 130, an individual authentication controlling unit 140, and an output unit 150. The functions of the acquiring unit 120, the region identifying unit 130, and the output unit 150 are similar to those according to the first example embodiment, and thus description thereof will be omitted.

The storage unit 110 according to the second example embodiment stores a set of facial feature information items of a plurality of persons of a group. The individual authentication controlling unit 140 according to the second example embodiment performs facial authentication of each of the facial regions identified by the region identifying unit 130 by use of the set of facial feature information items stored in the storage unit 110.

The flow of a photographing control method according to the second example embodiment is similar to that shown in FIG. 2. However, at step S103, the individual authentication controlling unit 140 performs the facial authentication of each of the facial regions identified at step S102 by use of the set of facial feature information items stored in the storage unit 110.

In this manner, the second example embodiment too can provide advantageous effects similar to those provided by the first example embodiment described above.

Third Example Embodiment

Figure 4:
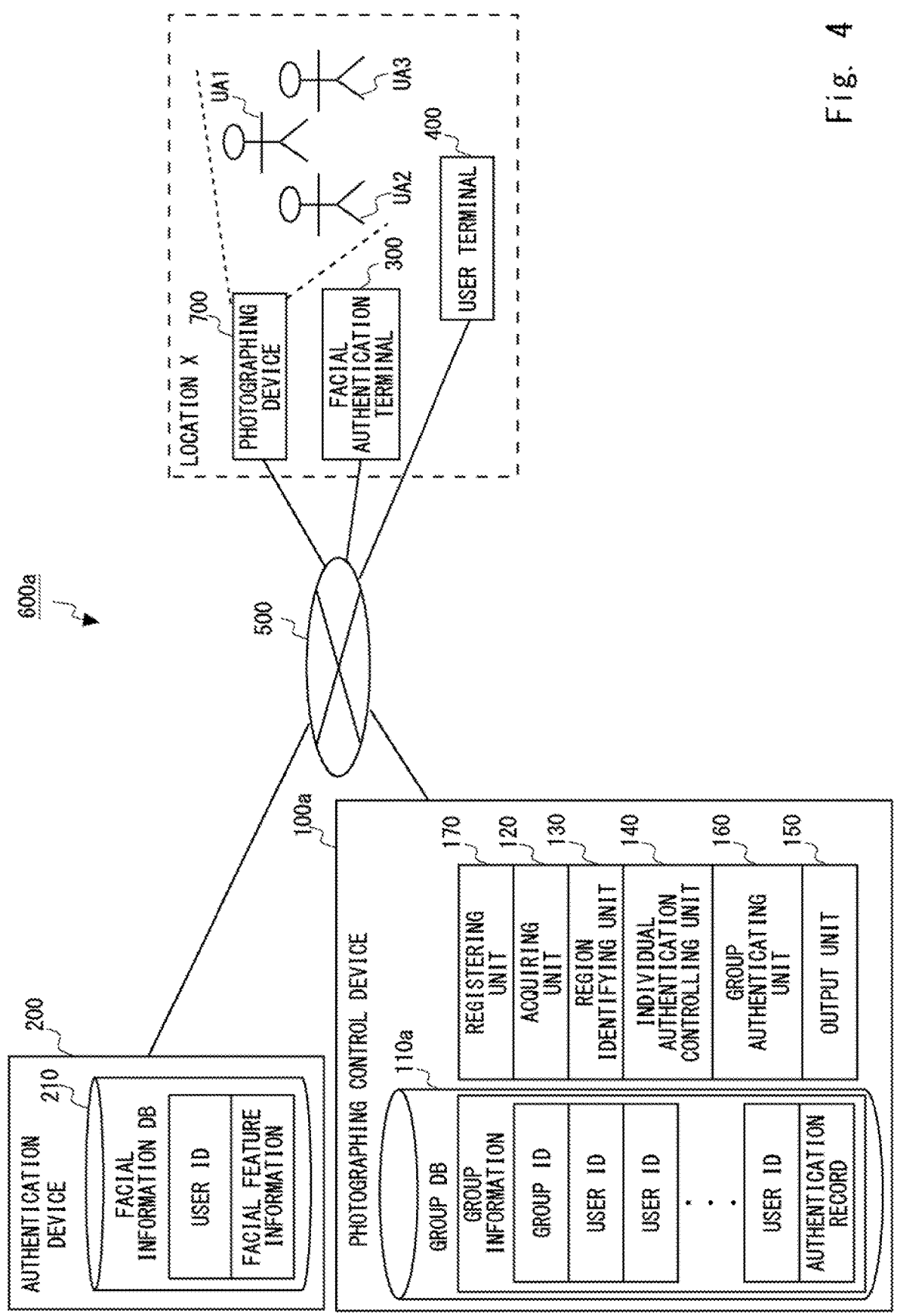
FIG. 4 is a block diagram illustrating a configuration of a photographing control system according to a third example embodiment.

A third example embodiment is a specific example of the first example embodiment described above. FIG. 4 is a block diagram illustrating a configuration of a photographing control system 600a according to the third example embodiment. The photographing control system 600a includes a photographing control device 100a, an authentication device 200, a photographing device 700, a facial authentication terminal 300, and a user terminal 400. The photographing control device 100a, the authentication device 200, the photographing device 700, the facial authentication terminal 300, and the user terminal 400 are connected to each other via a network 500.

According to the third example embodiment, facial feature information items of a plurality of users are registered in advance in the authentication device 200. Herein, each of the members of a predetermined group described later is included in the plurality of users. The photographing control device 100a according to the third example embodiment outputs a photographed image if all the members of a predetermined group are photographed altogether.

The photographing control device 100a includes a group DB 110a, a registering unit 170, an acquiring unit 120, a region identifying unit 130, an individual authentication controlling unit 140, a group authenticating unit 160, and an output unit 150. The photographing control device 100a registers a plurality of users as a group into the group DB 110a. The photographing control device 100a performs control in group authentication described later. Each function of the photographing control device 100a will be described later.

The authentication device 200 includes a facial feature DB 210. The facial feature DB 210 stores an association between each user ID and facial feature information of the user. The facial feature DB 210 is also referred to as a storage unit. The authentication device 200, in response to receiving a facial authentication request from the outside, compares a facial image or facial feature information included in the received request with regard to the facial feature information items of the respective users and returns the result of the comparison to the requestor. The photographing device 700 is installed at a location X. The photographing device 700 obtains a photographed image and transmits the photographed image to the photographing control device 100a via the network 500. The location X is, for example, a scramble intersection.

The facial authentication terminal 300 captures a registration image to be used for facial authentication of users UA1, UA2, and UA3. The facial authentication terminal 300 transmits the registration image to the authentication device 200 and makes a facial information registration request. Herein, the facial authentication terminal 300 may transmit facial feature information items extracted from the registration image to an authentication terminal and make a facial information registration request. The facial authentication terminal 300 may be installed at the location X or a location different from the location X. The facial authentication terminal 300 may be digital signage.

The user terminal 400 is a terminal owned by at least any one of the user UA1, UA2, or UA3. The user terminal 400 is, for example but not limited to, a mobile phone terminal, a smartphone, a tablet terminal, or a personal computer (PC) equipped with or connected to a camera. The user terminal 400 transmits, to the authentication device 200, a registration image to be used for facial authentication of the users UA1, UA2, and UA3 and makes a facial information registration request. Herein, the user terminal 400 may transmit facial feature information items extracted from the registration image to the authentication device 200 and make a facial information registration request. The user terminal 400 may receive an output image from the photographing control device 100a. Herein, it suffices that the photographing control system 600a include only one of the facial authentication terminal 300 or the user terminal 400 as a display device that receives and displays an output image. The photographing control system 600a can use, as a predetermined photographing device that obtains a photographed image, any one of the photographing device 700, the facial authentication terminal 300, or the user terminal 400. The photographing device 700 may transmit a registration image to the authentication device 200 and make a facial information registration request. Herein, the photographing device 700 may transmit facial feature information extracted from the registration image to the authentication device 200 and make a facial information registration request.

Specifically, the facial authentication terminal 300 and the user terminal 400 are each a device that registers facial feature information extracted from a user's facial image into the facial information DB 210 prior to group authentication, which will be described later. In this example, either of the method a or the method b below, for example, can be used as a method of registering a facial feature information item. Method a: Faces of multiple persons are photographed simultaneously, a plurality of facial regions are detected from one image, and each extracted facial feature information item is registered into the facial information DB 210. Method b: Faces of the group members are photographed sequentially, and facial feature information items extracted from the respective images are registered into the facial information DB 210. As will be described later, each facial feature information item is associated with a user ID and registered into the facial information DB 210. The photographing control device 100a associates a plurality of user IDs with a group ID and registers this plurality of user IDs as one group into the group DB 110a.

Figure 5:
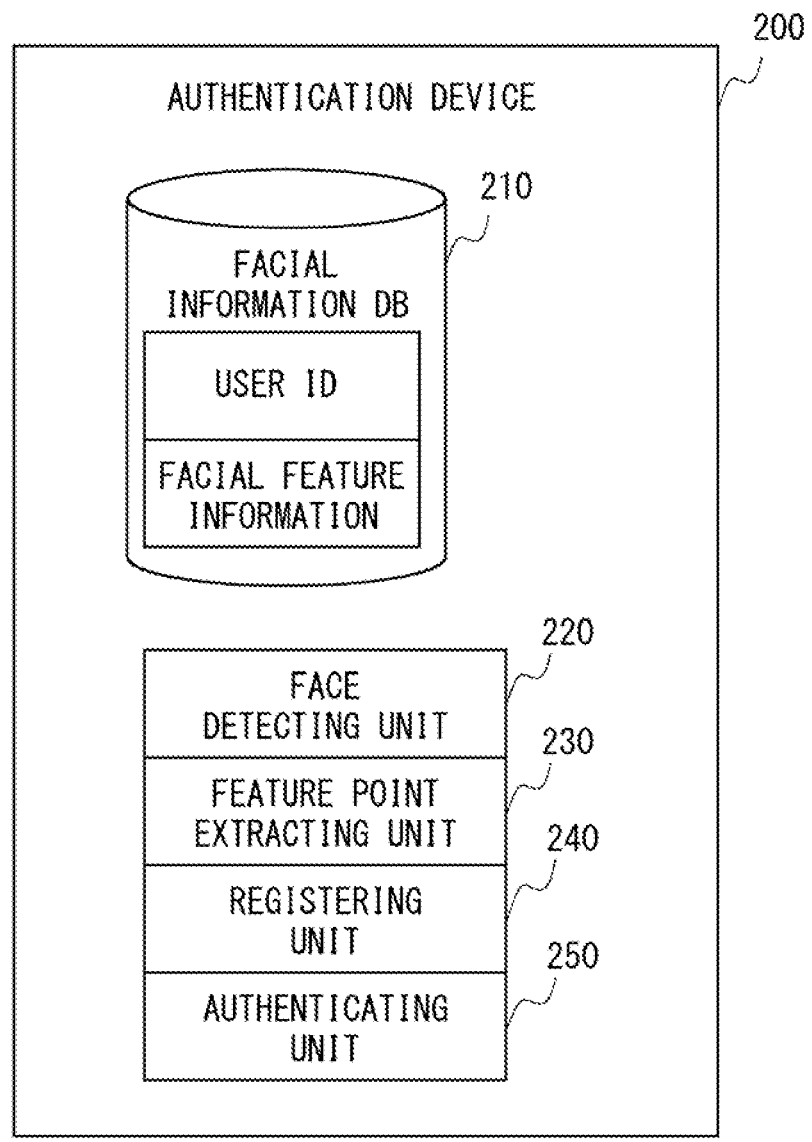
FIG. 5 is a block diagram illustrating a configuration of an authentication device according to the third example embodiment.

Next, some functions of the authentication device 200 will be described in detail. FIG. 5 is a block diagram illustrating a configuration of the authentication device 200. The authentication device 200 includes the facial information DB 210 described earlier, a face detecting unit 220, a feature point extracting unit 230, a registering unit 240, and an authenticating unit 250.

The face detecting unit 220 detects a facial region included in a registration image for registering facial information and outputs the detected facial region to the feature point extracting unit 230. The feature point extracting unit 230 extracts feature points from the facial region detected by the face detecting unit 220 and outputs facial feature information to the registering unit 240. In this example, the facial feature information is a set of extracted feature points. The feature point extracting unit 230 also extracts feature points included in a facial image received from the photographing control device 100a and outputs facial feature information to the authenticating unit 250.

The registering unit 240 issues a new user ID when registering facial feature information. The registering unit 240 registers an association between the issued user ID and the facial feature information extracted from the registration image into the facial information DB 210. The authenticating unit 250 compares the facial feature information extracted from the facial image with regard to the facial feature information in the facial information DB 210. The authenticating unit 250 returns, to the photographing control device 100a, the presence or absence of a match between the two facial feature information items. The presence or absence of a match between the two facial feature information items corresponds to the success or failure of authentication.

Figure 8:
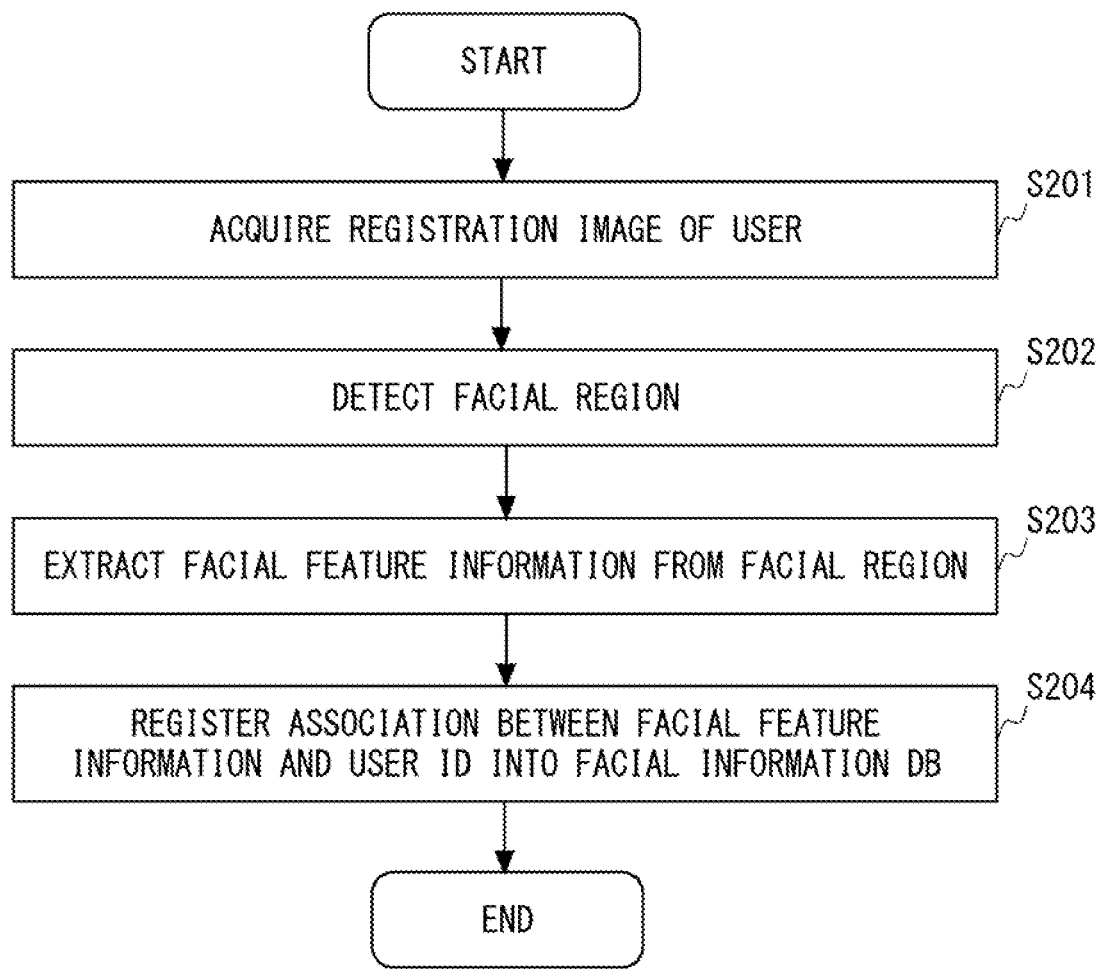
FIG. 8 is a flowchart illustrating a flow of a facial information registration process according to the third example embodiment.

FIG. 8 is a flowchart illustrating a flow of a facial information registration process performed by the authentication device 200. First, the authentication device 200 acquires a registration image included in a facial information registration request (step S201). For example, the authentication device 200 receives the facial information registration request from the facial authentication terminal 300 or the user terminal 400 via the network 500. Next, the face detecting unit 220 detects a facial region included in the registration image (step S202). Next, the feature point extracting unit 230 extracts feature points from the facial region detected at step S202 and outputs facial feature information to the registering unit 240 (step S203). Lastly, the registering unit 240 issues a user ID and registers an association between this user ID and the facial feature information into the facial information DB 210 (step S204). Herein, the authentication device 200 may receive facial feature information from a facial authentication terminal or the like and register an association between the facial feature information and the user ID into the facial information DB 210.

Figure 9:
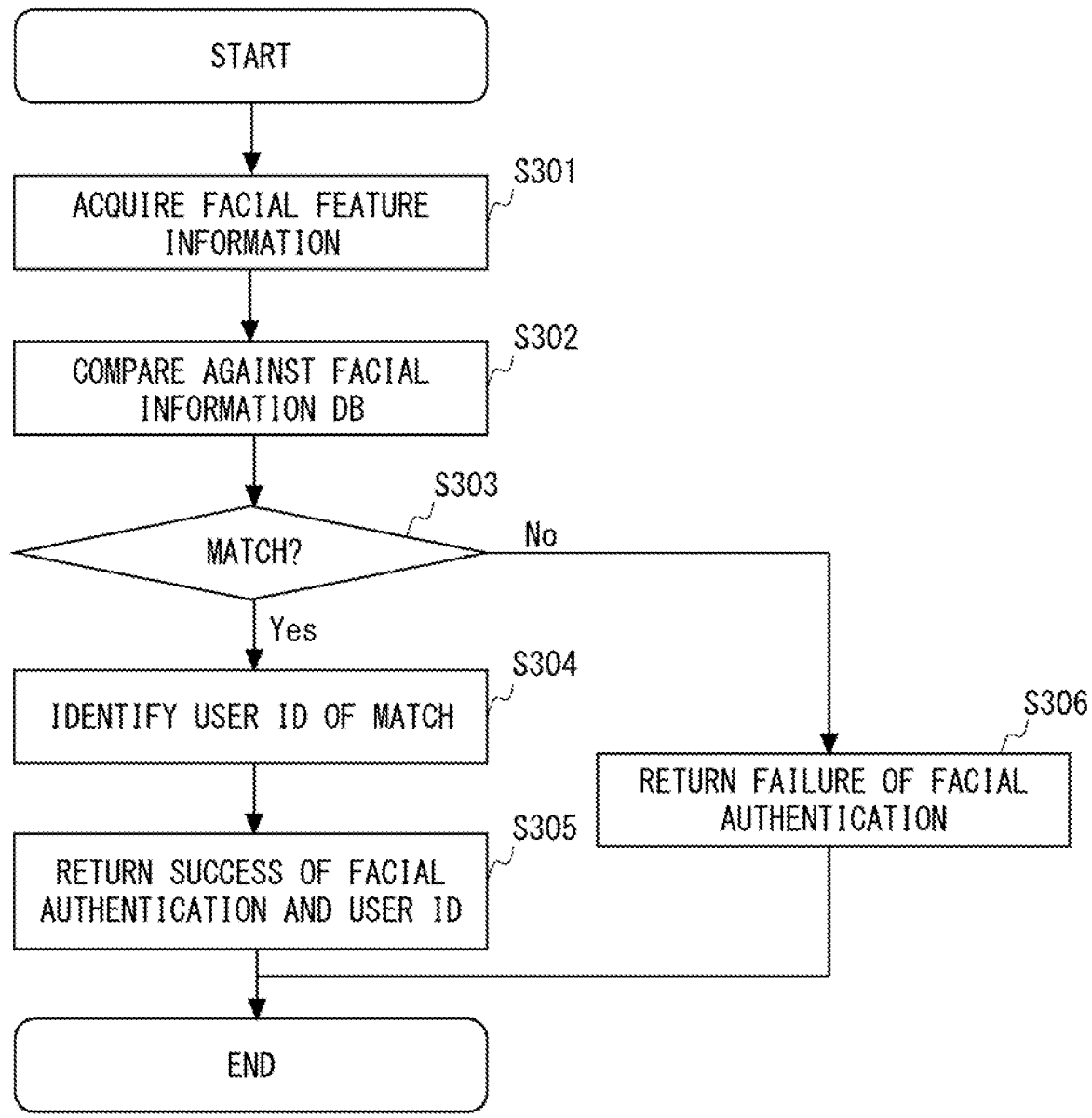
FIG. 9 is a flowchart illustrating a flow of a facial authentication process according to the third example embodiment.

FIG. 9 is a flowchart illustrating a flow of a facial authentication process performed by the authentication device 200. First, the feature point extracting unit 230 acquires facial feature information from a facial image received from the photographing control device 100a (step S301). For example, the authentication device 200 receives the facial image from the photographing control device 100a and extracts the facial feature information as in steps S201 to S203. Alternatively, the authentication device 200 may receive the facial feature information from the photographing control device 100a. Next, the authenticating unit 250 compares the acquired facial feature information with regard to the facial information DB 210 (step S302). If the facial feature information has a match (Yes at step S303), the authenticating unit 250 identifies the user ID of the user that the facial feature information has matched with (step S304) and returns the success of the facial authentication and the identified user ID to the photographing control device 100a (step S305). If the facial feature information has no match (No at step S303), the authenticating unit 250 returns the failure of the facial authentication to the photographing control device 100a (step S306).

Figure 6:
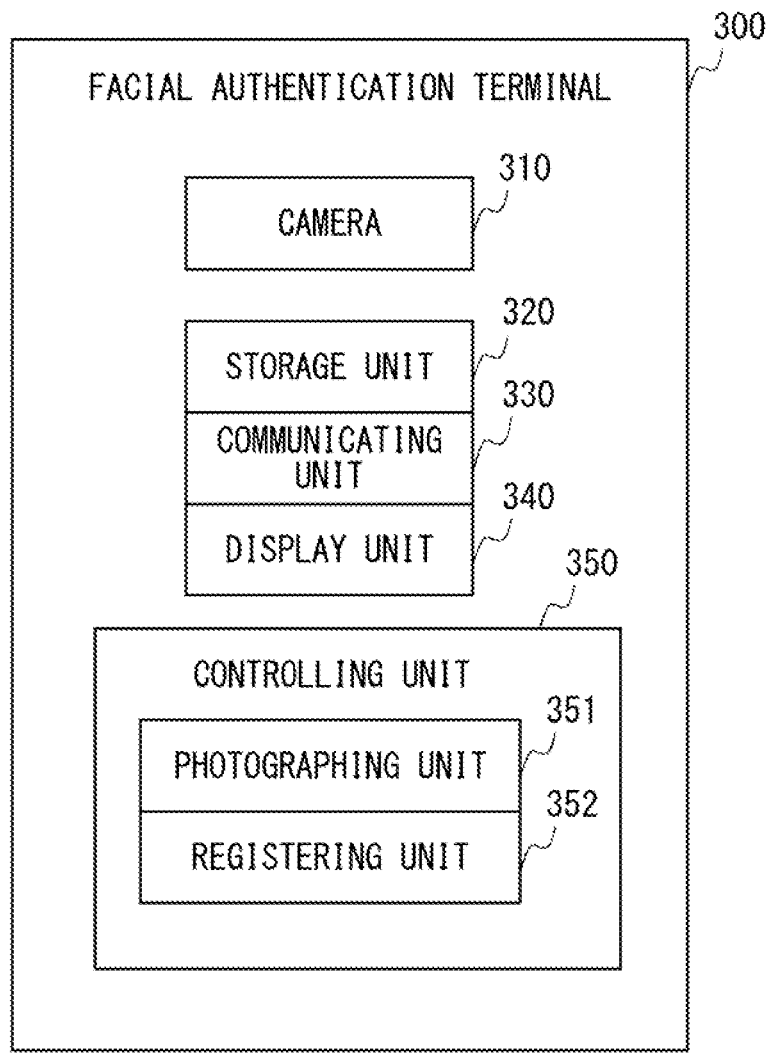
FIG. 6 is a block diagram illustrating a configuration of a facial authentication terminal according to the third example embodiment.

Next, the facial authentication terminal 300 will be described in detail. The facial authentication terminal 300 includes, as its hardware components, a photographing device such as a camera, a display device, and a computer. FIG. 6 is a block diagram illustrating a configuration of the facial authentication terminal 300. The facial authentication terminal 300 includes a camera 310 as mentioned above, a storage unit 320, a communicating unit 330, a display unit 340, and a controlling unit 350. The storage unit 320 is a storage device that stores a program for implementing each function of the facial authentication terminal 300. The communicating unit 330 is a communication interface with the network 500. The display unit 340 is the display device mentioned above. The controlling unit 350 controls hardware components of the facial authentication terminal 300. The controlling unit 350 includes a photographing unit 351 and a registering unit 352.

The photographing unit 351 controls the camera 310 to obtain a registration image of a user. The registration image is an image that includes at least a facial image of the user. The registering unit 352 transmits a facial information registration request including the registration image to the authentication device 200 via the network 500. Herein, the facial authentication terminal 300 may be capable of displaying an output image on a screen of the display unit 340.

Figure 7:
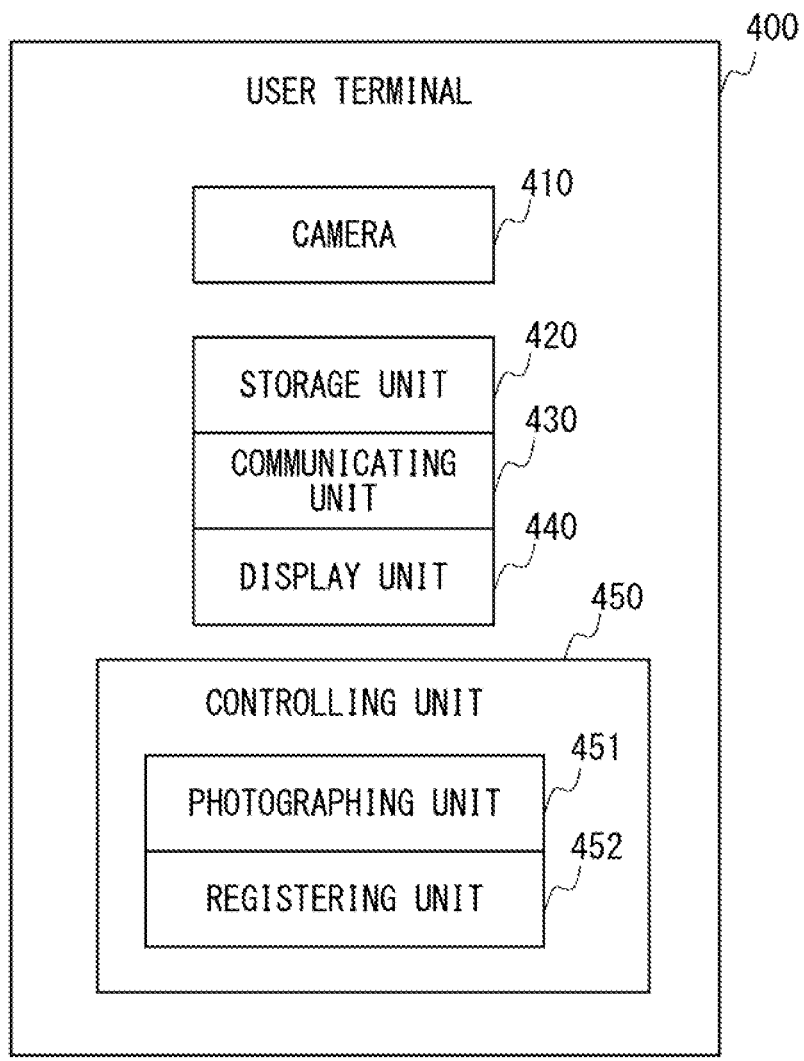
FIG. 7 is a block diagram illustrating a configuration of a user terminal according to the third example embodiment.

Next, the user terminal 400 will be described. The user terminal 400 is, for example but not limited to, a mobile phone terminal or a PC owned by a user. FIG. 7 is a block diagram illustrating a configuration of the user terminal 400. Similarly to the facial authentication terminal 300, the user terminal 400 includes a camera 410, a storage unit 420, a communicating unit 430, and a display unit 440. The user terminal 400 further includes a controlling unit 450 that controls the aforementioned hardware components. Similarly to the controlling unit 350 of the facial authentication terminal 300, the controlling unit 450 includes a photographing unit 451 and a registering unit 452. The user terminal 400 may be capable of displaying an output image on a screen of the display unit 440.

The facial authentication terminal 300 and the user terminal 400 each have a function of making a facial information registration request and a group registration request. Flows of the facial information registration process and the group registration process will be described below. Although the user terminal 400 is used in the case described below, a similar process may be performed by the facial authentication terminal 300.

First, the facial information registration process will be described. The photographing unit 451 first controls the camera 410 to obtain a registration image of a user. Next, the registering unit 452 transmits a facial information registration request including the registration image to the authentication device 200 via the network 500. Lastly, the registering unit 452 receives the result of the authentication from the authentication device 200. Herein, the registering unit 452 may transmit, to the authentication device 200, a facial information registration request including facial feature information extracted from the registration image.

Next, an example of the group registration process will be described. First, the user terminal 400 performs the above-described facial information registration process individually for each user belonging to a group in accordance with the user operation. Next, the user terminal 400 transmits a group registration request to the photographing control device 100a in accordance with an operation performed by one user within the group, and registers a definition of members belonging to that group.

Next, referring back to FIG. 4, some functions of the photographing control device 100a will be described. The photographing control device 100a is an information processing device that performs group registration and group authentication and is, for example, a server device implemented by a computer. As illustrated in FIG. 5, the photographing control device 100a includes the group DB 110a, the registering unit 170, the acquiring unit 120, the region identifying unit 130, the individual authentication controlling unit 140, the group authenticating unit 160, and the output unit 150.

The group DB 110a is a database for managing members belonging to a group. Members belonging to a group are also referred to as users. In the group DB 110a, for each record of group information, for example, one group ID, one or more user IDs, and an authentication record are associated with each other. The authentication record is information indicating that group authentication has succeeded. The authentication record may be a flag or may include, for example but not limited to, the date and time when and the location where the group authentication has succeeded.

The registering unit 170 receives a group registration request from the facial authentication terminal 300 or the user terminal 400 via the network 500. The registering unit 170 issues a group ID corresponding to a plurality of user IDs included in the received group registration request. The registering unit 170 generates group information associating the issued group ID with each of the user IDs and registers the generated group information into the group DB 110*a*.

In a case where a group registration request includes one group ID and one or more user IDs, the registering unit 170 may search the group DB 110*a* for the group ID included in the received group registration request. In such a case, the registering unit 170 further associates the one or more user IDs included in the received group registration request with the searched group ID and updates the group information. It is to be noted that the group registration process is not limited to this example.

The acquiring unit 120 acquires a photographed image from the photographing device 700. Herein, the photographed image includes facial regions of multiple persons. The region identifying unit 130 identifies a plurality of facial regions from the photographed image. For example, the region identifying unit 130 recognizes the plurality of facial regions by analyzing the photographed image. In response to the plurality of facial regions having been identified, the individual authentication controlling unit 140 causes the authentication device 200 to perform facial authentication of each of the identified facial regions by use of a set of facial feature information items.

The group authenticating unit 160 refers to the group DB 110*a* and performs group authentication. In other words, the group authenticating unit 160 determines whether facial authentication of the facial feature information items of the respective persons belonging to the group has succeeded with regard to any one of the plurality of facial regions. If the group authentication has succeeded, the group authenticating unit 160 registers the success of the group authentication into the group DB 110*a*.

Moreover, if the facial regions with regard to which the facial feature information items of the respective persons belonging to the group have been successfully authenticated in the facial authentication fall within a predetermined range, the group authenticating unit 160 may register, into the group DB 110*a*, an association between the success of the group authentication and the group. In other words, the group authenticating unit 160 may be configured not to authenticate as a group when the persons fail to be close to each other within a certain range. For example, a case where the persons belonging to a group are accidentally captured within the same frame is considered inappropriate as a photographed image of the group. Accordingly, except in such a case, the accuracy of group authentication can be improved.

The output unit 150 outputs the photographed image as an output image if the group authentication has succeeded. If a part of the facial feature information items of the respective persons belonging to the group fails to succeed in the facial authentication with any one of the plurality of facial regions, the output unit 150 provides an output indicating that the person or persons corresponding to the part of the facial feature information items are not included in the photographed image. In other words, if facial authentication of a part of the group members has failed, the output unit 150 provides an output indicating that a part of the users is not included in the photographed image.

Herein, the group authenticating unit 160 may edit the photographed image so as to highlight the user or users whose facial authentication has succeeded or failed. In that case, the output unit 150 outputs the edited image as an output image. This configuration allows the group members to easily recognize the user whose facial authentication has failed. Moreover, the above configuration allows the group members to easily grasp which member is not included when the group has a large number of members.

Figure 10:
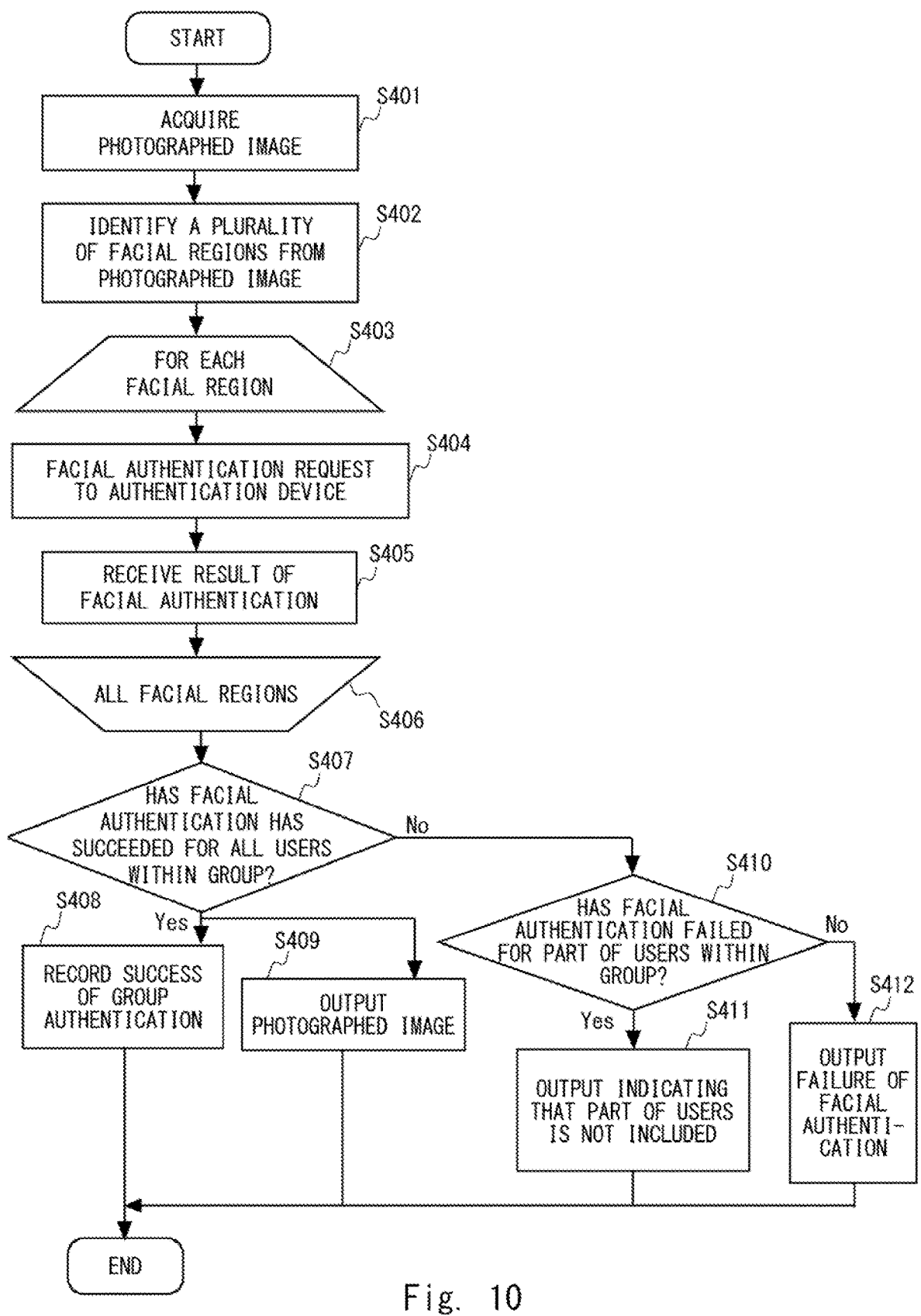
FIG. 10 is a flowchart illustrating a flow of a group authentication process according to the third example embodiment.

FIG. 10 is a flowchart illustrating a flow of a group authentication process. In the example described below, the user ID of user UA1, the user ID of a user UA2, and the user ID of a user UA3 are associated as a group A and registered in the group DB 110*a*.

First, the acquiring unit 120 of the photographing control device 100*a* acquires a photographed image from the photographing device 700 (step S401). Next, the region identifying unit 130 identifies a plurality of facial regions from the photographed image (step S402). Next, the individual authentication controlling unit 140 causes the authentication device 200 to perform facial authentication of each of the identified facial regions and receives the result of the facial authentication (step S403 to step S406).

After the facial authentication has been performed with regard to all of the plurality of facial regions identified at step S402, the group authenticating unit 160 determines whether the facial authentication has succeeded for all the users within the group (step S407). For example, if the group authenticating unit 160 has received, as the result of the facial authentication, the ID of the user UA1, the ID of the user UA2, and the ID of the user UA3, the group authenticating unit 160 determines that the facial authentication has succeeded for all the users within the group. Meanwhile, for example, if the group authenticating unit 160 has received, as the result of the facial authentication, the ID of the user UA1 and the ID of the user UA2 but not the ID of the user UA3, the group authenticating unit 160 determines that the group authentication has failed.

If the facial authentication has succeeded for all the users within the group (Yes at step S407), the group authenticating unit 160 records the success of the group authentication (step S408). For example, the group authenticating unit 160 updates the group DB 110*a* by adding this success of the group authentication into the authentication record associated with the group A. Moreover, if the facial authentication has succeeded for all the users within the group, the output unit 150 outputs the photographed image (step S409).

If the facial authentication has not succeeded for all the users within the group (No at step S407), the group authenticating unit 160 determines whether the facial authentication has failed for a part of the users within the group (step S410). The case where the facial authentication has failed for a part of the users within the group means, for example, a case where the individual authentication controlling unit 140 has received, as the result of the authentication, the user ID of the user UA1 and the user ID of the user UA2 but not the user ID of the user UA3 from the authentication device 200. If the facial authentication has failed for a part of the users within the group (Yes at step S410), the output unit 150 provides an output indicating that a part of the users is not included (step S411). Herein, the output at step S411 may be provided, for example, to the user terminal 400 to which the user UA1 or the user UA2, for whom the facial authentication has succeeded, has logged in with his or her user ID or the display unit 340 or the like of the facial authentication terminal 300, which is user-independent.

The group authenticating unit 160 may identify the user or users for which the facial authentication has failed based on the difference between the user IDs of all the members within the group and the user IDs of the users for which the facial authentication has succeeded. Then, the output unit 150 may provide, to the user terminal 400 of an identified user, an output indicating that the facial authentication of that user has failed. Furthermore, the output unit 150 may notify this identified user of a reason why the group authentication has failed. Examples of reasons why the group authentication has failed include that this user is apart from the other members of the group or that the facial authentication of this user has failed. In this example, the group authenticating unit 160 may offer this user guidance for rephotographing so that the user approaches the other members or the user turns his or her face toward the camera.

If the facial authentication has failed for all the users within the group (No at step S410), the output unit 150 outputs the failure of the facial authentication (step S412). Herein, the output at step S412 may be provided to the display unit 340 or the like of the facial authentication terminal 300, which is user-independent.

Figure 11:
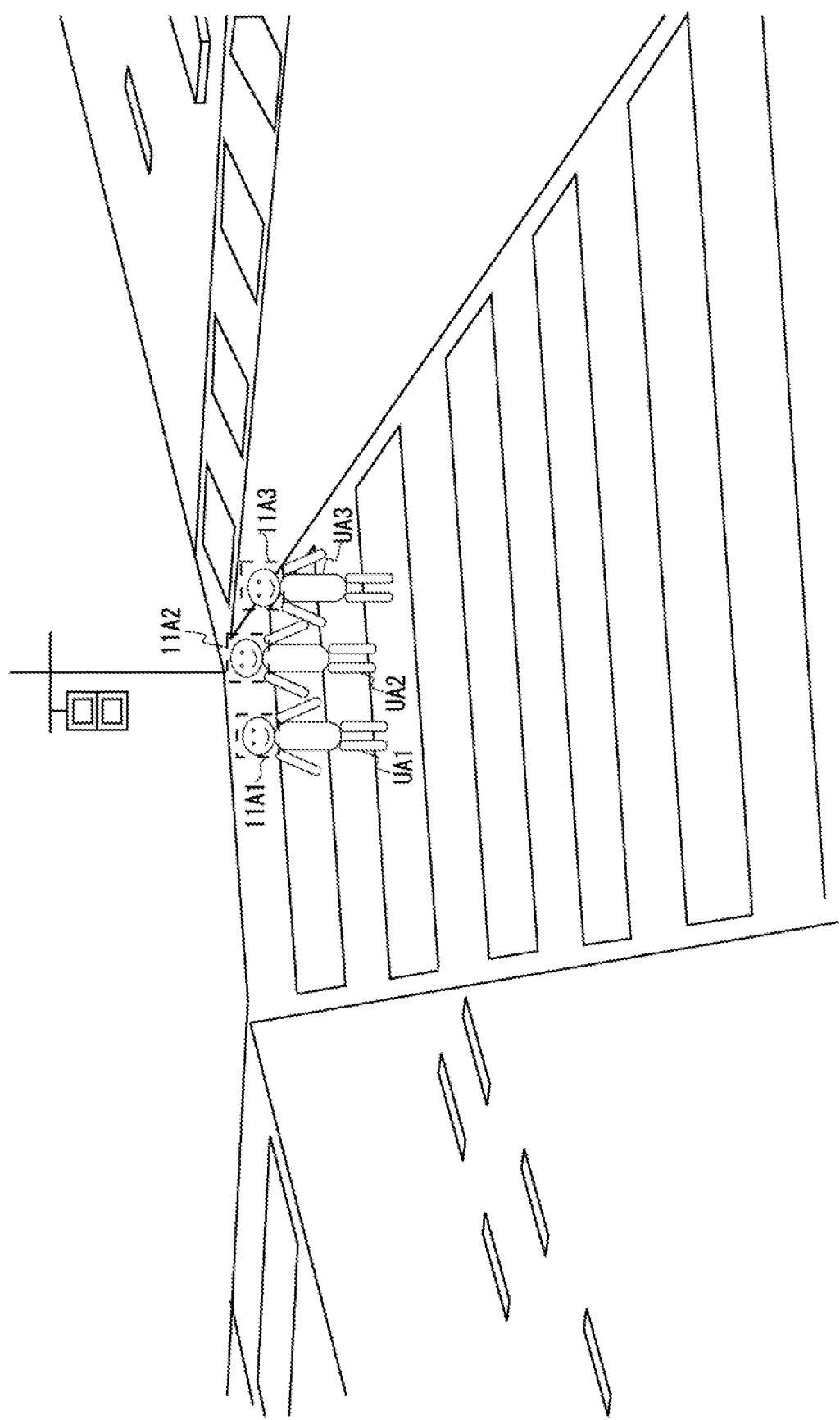
FIG. 11 illustrates an example of a photographed image according to the third example embodiment.

FIG. 11 illustrates an example of a photographed image obtained by the photographing device 700. The user UA1, the user UA2, and the user UA3 are members of a group. The photographing control device 100a identifies facial regions 11A1, 11A2, and 11A3 and causes the authentication device 200 to perform facial authentication. The authentication device 200 transmits the user IDs of the users UA1, UA2, and UA3. The photographing control device 100a determines that the group authentication has succeeded and outputs the photographed image. The present example embodiment allows the users to obtain a group picture capturing all the members of the group.

Fourth Example Embodiment

A photographed image obtained by the photographing device 700 according to the third example embodiment may include persons from a plurality of groups. If this is the case, it is desirable to provide privacy protection on a group by group basis. A photographing control device 100b according to a fourth example embodiment provides privacy protection on a group by group basis and sorts persons in a photographed image into a plurality of groups.

Figure 12:
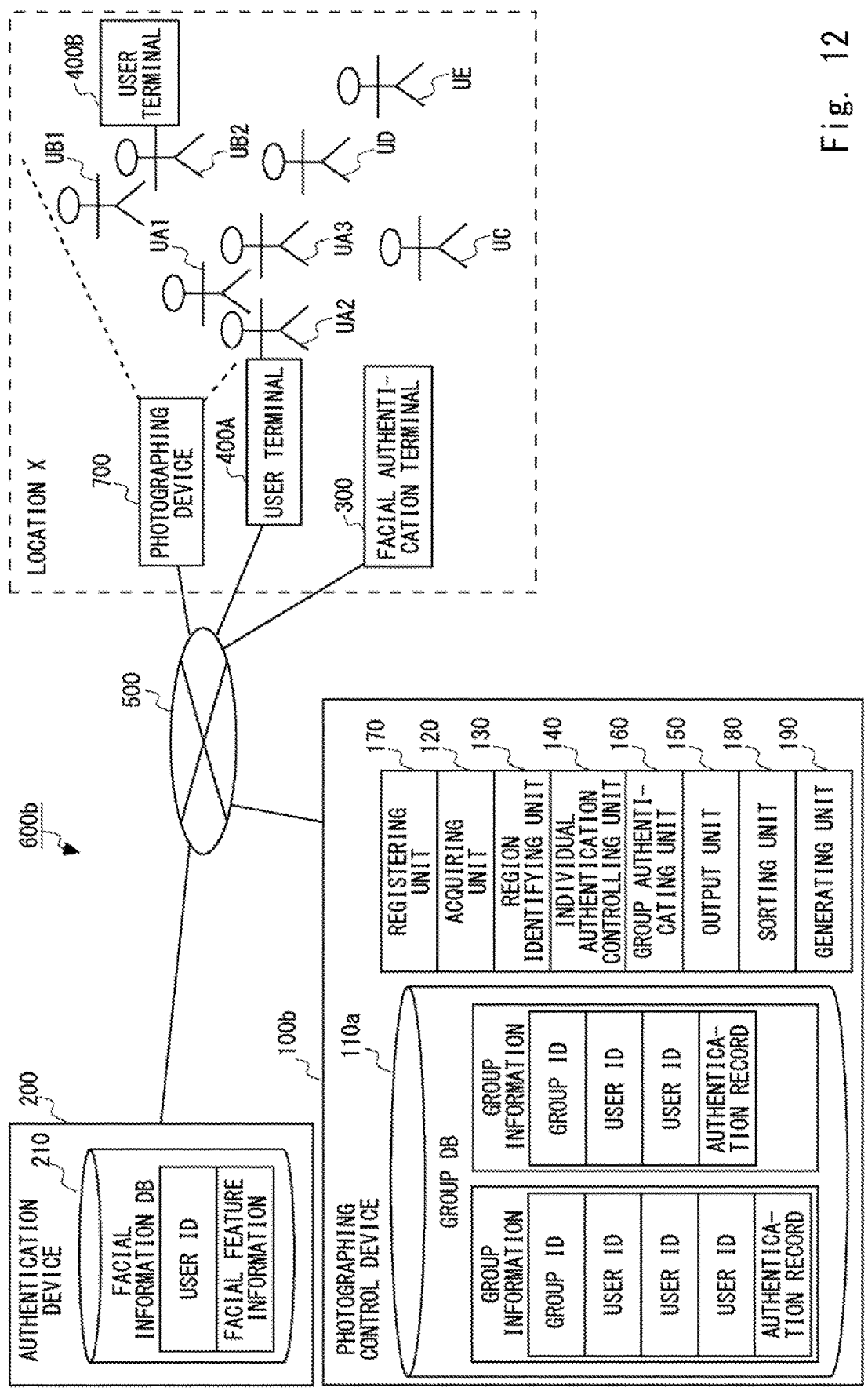
FIG. 12 is a block diagram illustrating a configuration of a photographing control system according to a fourth example embodiment.

FIG. 12 is a block diagram illustrating a configuration of a photographing control system 600b according to the fourth example embodiment. The photographing control device 100b, an authentication device 200, the photographing device 700, a facial authentication terminal 300, and user terminals 400 are connected to each other via a network 500, as in the third example embodiment. The authentication device 200, the photographing device 700, the facial authentication terminal 300, and the user terminals 400 are similar to the counterparts according to the third example embodiment, and thus description thereof will be omitted.

The photographing control device 100b includes a group DB 110a, a registering unit 170, an acquiring unit 120, a region identifying unit 130, an individual authentication controlling unit 140, a group authenticating unit 160, an output unit 150, a sorting unit 180, and a generating unit 190. The functions of the registering unit 170, the acquiring unit 120, the region identifying unit 130, the individual authentication controlling unit 140, and the output unit 150 are similar to those according to the third example embodiment, and thus description thereof will be omitted.

The group DB 110a has two group information items registered therein. For example, users UA1, UA2, and UA3 are registered in a group ID:A, and users UB1 and UB2 are registered in a group ID:B.

A plurality of users UA1, UA2, UA3, UB1, UB2, UC, UD, and UE are at a location X. The users UA1, UA2, and UA3 are members of a group A. The users UB1 and UB2 are members of a group B. The users UC, UD, and UE are persons who do not belong to either of the group A or B.

The sorting unit 180 of the photographing control device 100b sorts each facial region that has succeeded in facial authentication into the group that includes the corresponding facial feature information item. For example, if facial authentication has succeeded for the users UA1, UA2, UA3, UB1, and UB2, their facial regions are each sorted into the group A or the group B.

When facial authentication of all the facial feature information items belonging to a group has succeeded, the group authenticating unit 160 registers an association between that group and the success of the group authentication into the group DB 110a. For example, if group authentication has succeeded for the groups A and B, the group authenticating unit 160 registers the success of the group authentication into the authentication records of the respective groups.

The generating unit 190 generates, for each group, an edited image obtained by editing a photographed image so as to reduce the recognizability of a facial region, among a plurality of facial regions, of a person who does not belong to the specific group. For example, in an edited image for the group A, the facial regions of the users UB1, UB2, UC, UD, and UE, who do not belong to the group A, are subjected to mosaic processing. Meanwhile, in an edited image for the group B, the facial regions of the users UA1, UA2, UA3, UC, UD, and UE, who do not belong to the group B, are subjected to mosaic processing.

Figure 14:
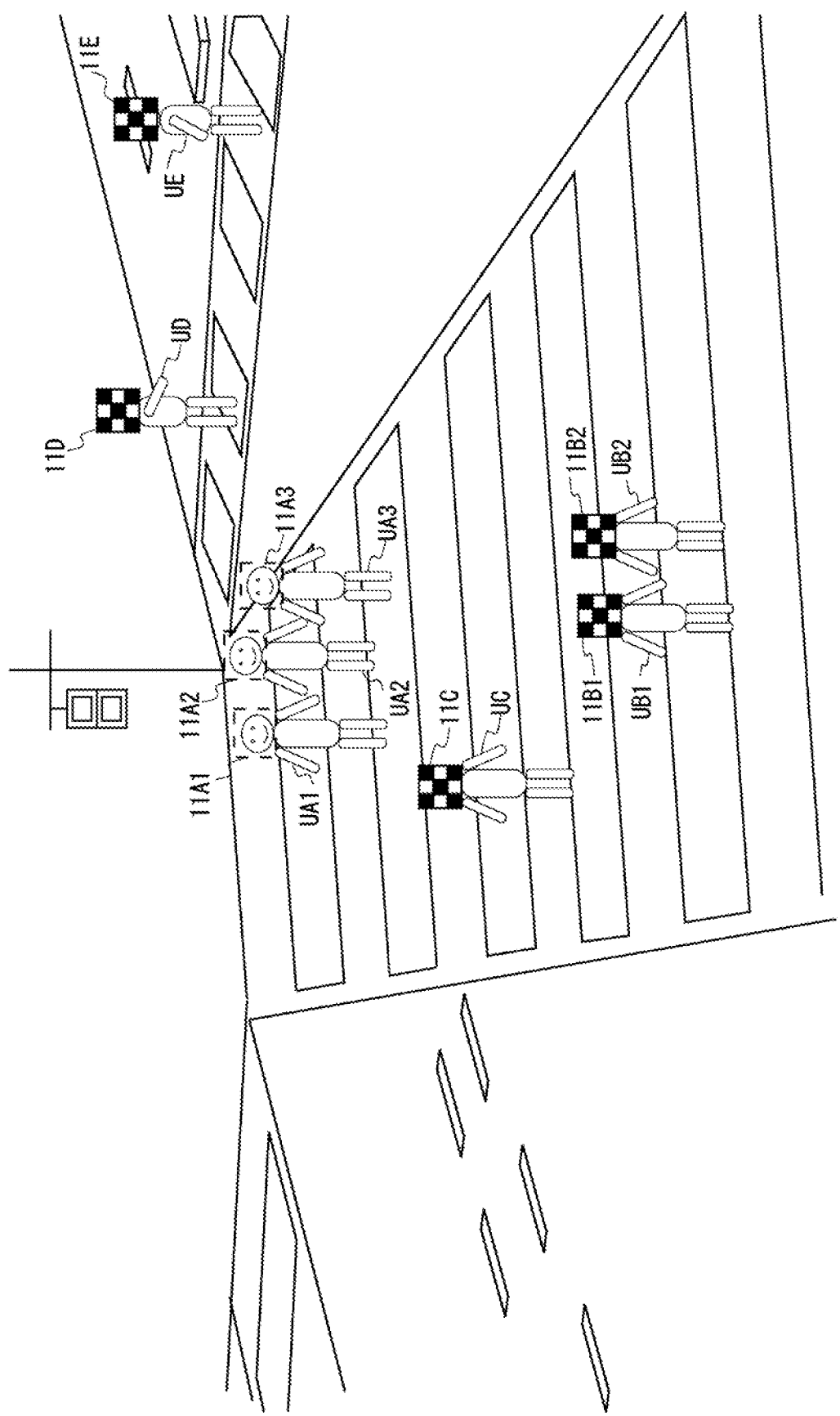
FIG. 14 illustrates an example of an output image according to the fourth example embodiment.

FIG. 14 illustrates an example of an edited image that the generating unit 190 generates. FIG. 14 illustrates an edited image for the group A. Facial regions 11B1 and 11B2 of the respective users UB1 and UB2 belonging to the group B have been subjected to mosaic processing so as to reduce their recognizability. Facial regions 11C, 11D, and 11E of the respective users UC, UD, and UE, who do not belong to any group, have been subjected to mosaic processing so as to reduce their recognizability. In contrast, facial regions 11A1, 11A2, and 11A3 of the respective users UA1, UA2, and UA3 belonging to the group A are not subjected to mosaic processing.

In a similar manner, in an edited image for the group B, the facial regions 11A1, 11A2, and 11A3 of the respective users UA1, UA2, and UA3 belonging to the group A are subjected to mosaic processing so as to reduce their recognizability. In addition, the facial regions 11C, 11D, and 11E of the respective users UC, UD, and UE, who do not belong to any group, are subjected to mosaic processing so as to reduce their recognizability. In contrast, in the edited image for the group B, the facial regions 11B1 and 11B2 of the respective users UB1 and UB2 belonging to the group B are not subjected to mosaic processing.

The output unit 150 outputs, to the user terminal 400 of a user in a given group, an edited image corresponding to that group as an output image. For example, an edited image for the group A is output to the user terminal 400 of the user UA2 belonging to the group A. Herein, the user UA2 is logged in to the user terminal 400 with his or her user ID. In a similar manner, the output unit 150 outputs an edited image for the group B to the user terminal 400 of the user UB2 belonging to the group B.

Figure 13:
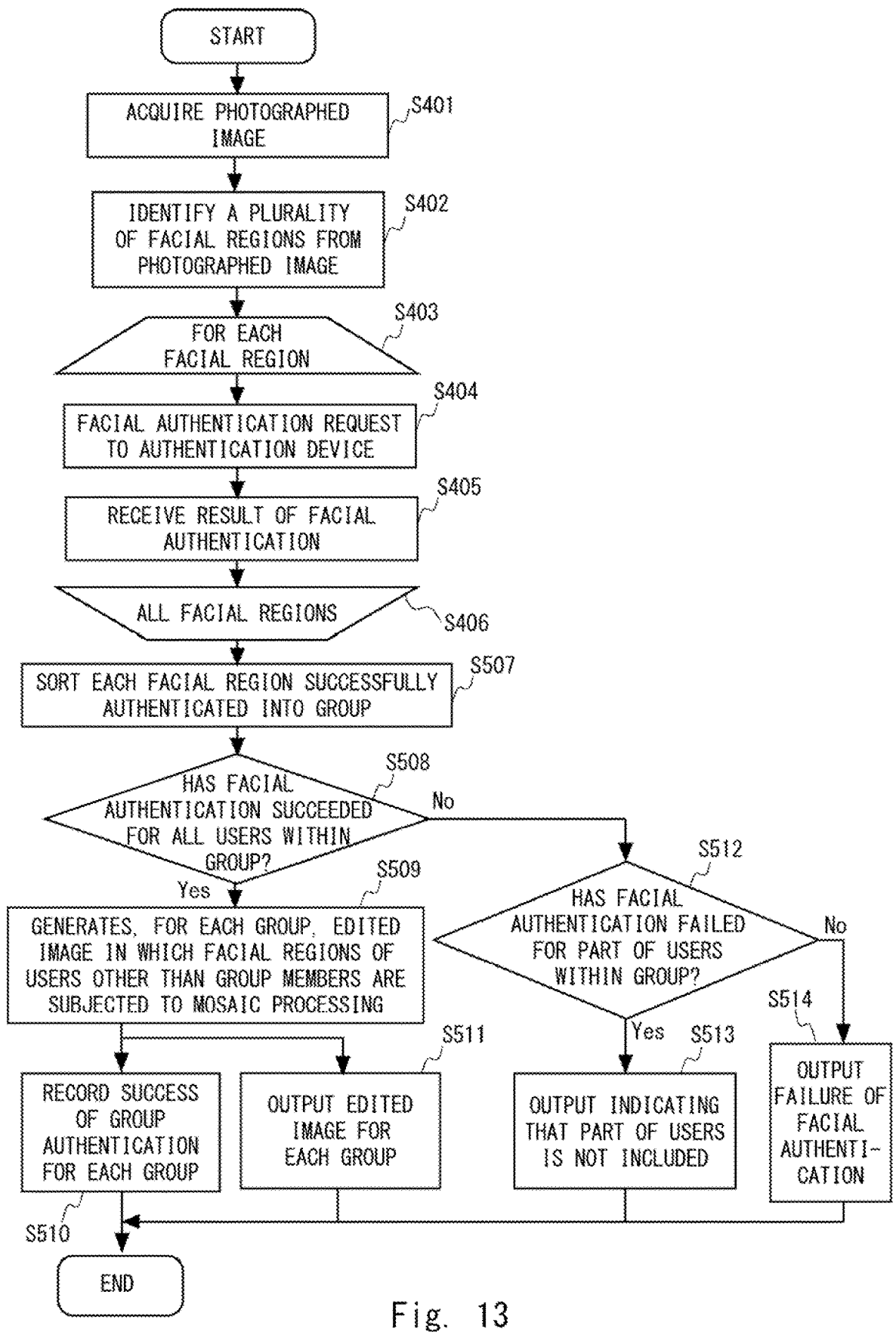
FIG. 13 is a flowchart illustrating a flow of a group authentication process according to the fourth example embodiment.

FIG. 13 is a flowchart illustrating a flow of a group authentication process. Step S401 to step S406 are similar to those of FIG. 10, and thus description thereof will be omitted. At step S507, the sorting unit 180 sorts each facial region that has succeeded in the facial authentication into a group. Next, the photographing control device 100*b* determines whether the facial authentication has succeeded for all the users within a group (step S508).

For the group in which the facial authentication has succeeded for all the users therewithin, the photographing control device 100*b* generates an edited image as described above (step S509), records the success of the group authentication (step S510), and outputs the edited image (step S511). As described above, an edited image is generated for each group.

If the facial authentication has failed for at least a part of the members of the group, the photographing control device 100*b* determines whether the facial authentication has failed for a part of the group or for all the users of the group (step S512). If the facial authentication has failed for a part of the group, the photographing control device 100*b* provides an output to that effect (step S513). In this example, the photographing control device 100*b* may identify a person for whom the facial authentication has failed and offer guidance for rephotographing to the user terminal 400 of the identified person. If the facial authentication has failed for all the users of the group, the photographing control device 100*b* outputs the failure of the facial authentication (step S514).

This configuration subjects an output image of a user belonging to the group A to mosaic processing in the facial regions of users other than those in the group A. Accordingly, the above configuration can protect the privacy of the users of the group B or the users who do not belong to any group.

Fifth Example Embodiment

Figure 15:
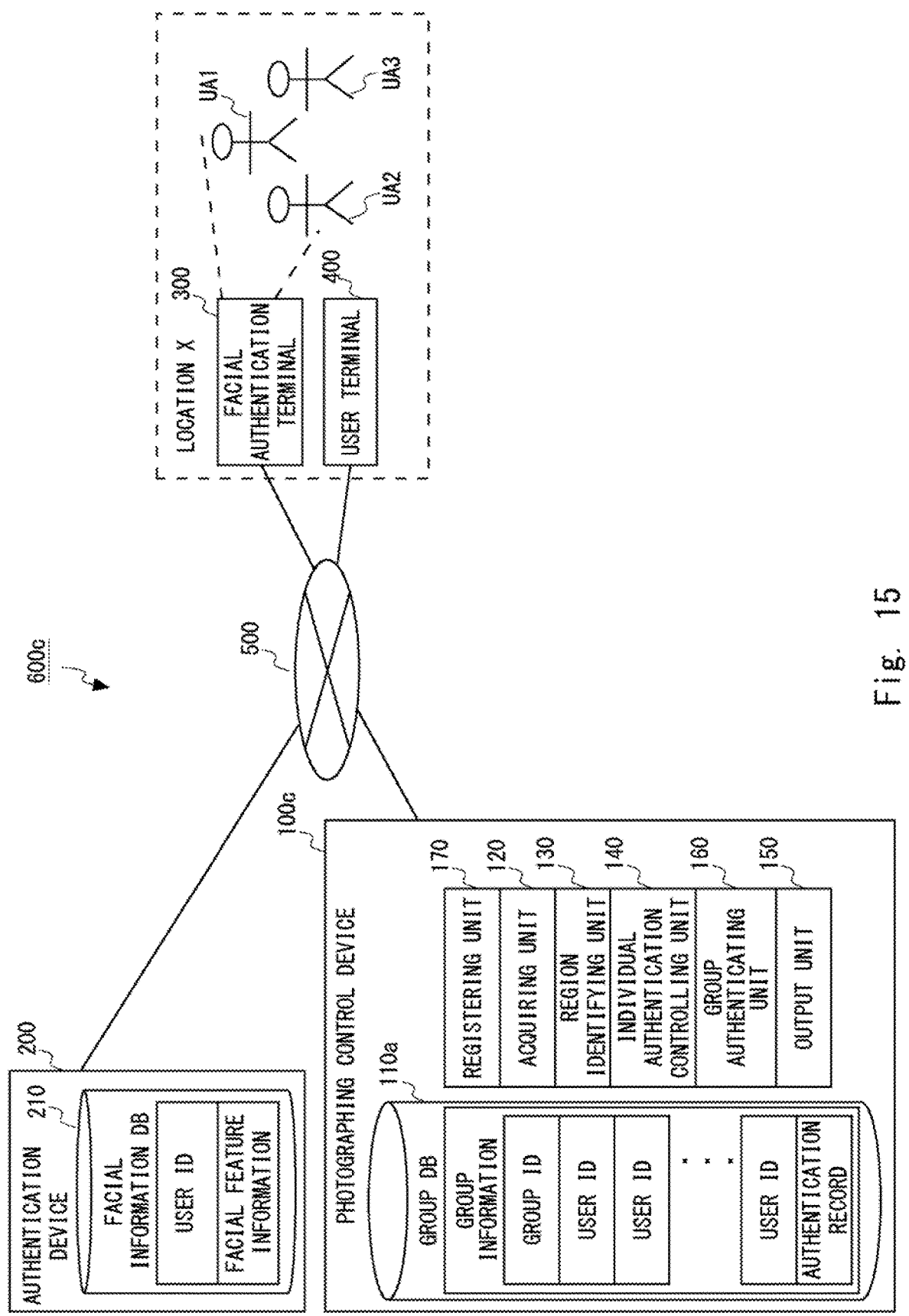
FIG. 15 is a block diagram illustrating a configuration of a photographing control system according to a fifth example embodiment.

A photographing control system 600*c* according to a fifth example embodiment makes a record that all the group members have passed a checkpoint in, for example, a point rally. FIG. 15 is a block diagram illustrating a configuration of the photographing control system 600*c*. The photographing control system 600*c* includes a photographing control device 100*c*, an authentication device 200, a facial authentication terminal 300, and a user terminal 400, and these components are connected to each other via a network 500. The facial authentication terminal 300 is installed at a location X that is a checkpoint in a point rally.

According to the fifth example embodiment, the facial authentication terminal 300 obtains a photographed image. The facial authentication terminal 300 or the user terminal 400 displays an output image. Therefore, the user terminal 400 is optional according to the fifth example embodiment. The function of the authentication device 200 is similar to the function according to the other example embodiments, and thus description thereof will be omitted.

Figure 16:
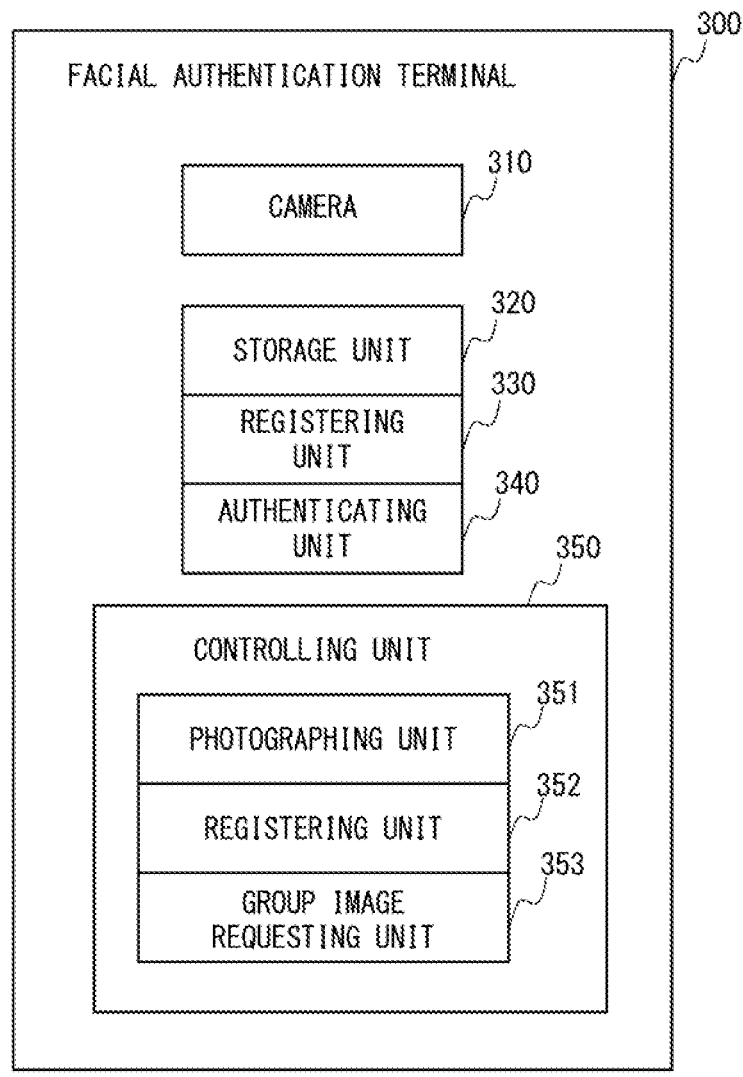
FIG. 16 is a block diagram illustrating a configuration of a facial authentication terminal according to the fifth example embodiment.

FIG. 16 is a block diagram illustrating functions of the facial authentication terminal 300. The differences from the third example embodiment will be described below. A camera 310 is used to obtain not only a registration image but also a photographed image at a checkpoint.

A controlling unit 350 includes a group image requesting unit 353. The group image requesting unit 353 causes group authentication to be performed by transmitting a photographed image to the photographing control device 100*c*. If all the members of a group are captured in the photographed image, the facial authentication terminal 300 acquires this photographed image from the photographing control device 100*c* and causes the display unit 340 to display the photographed image. The facial authentication terminal 300 is, for example but not limited to, digital signage.

Next, a process performed by the facial authentication terminal 300 will be described. The facial information registration process and the group registration process are similar to those according to the third example embodiment, and thus description thereof will be omitted. A group authentication process will be described below.

The group image requesting unit 353 transmits a group authentication request including a photographed image obtained by the camera 310 to the photographing control device 100*c* via the network 500 and receives the result of the group authentication. The group image requesting unit 353 receives the photographed image and causes the display unit 340 to display the photographed image. If facial authentication has failed for a part of the group members, the group image requesting unit 353 receives a notification indicating that a part of the users is not included and displays to that effect on the display unit 340. If facial authentication has failed for all the group members, the group image requesting unit 353 receives the failure of the facial authentication and displays to that effect on the display unit 340.

Figure 17:
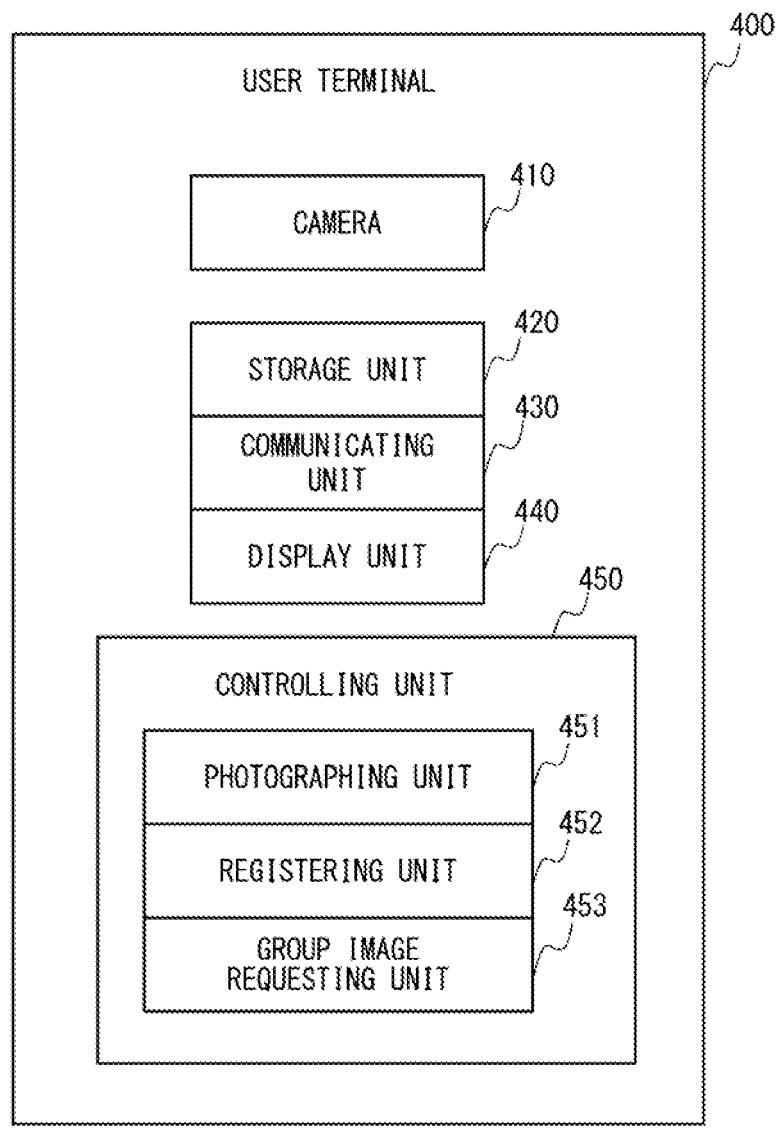
FIG. 17 is a block diagram illustrating a configuration of a user terminal according to the fifth example embodiment.

The user terminal 400 is, for example, a mobile terminal owned by a user. FIG. 17 is a block diagram illustrating a configuration of the user terminal 400. The user terminal 400 has functions similar to those of the facial authentication terminal 300. The processes performed by the facial authentication terminal 300 in the facial information registration process, the group registration process, and the group authentication process described above may be performed by the user terminal 400.

Next, referring back to FIG. 15, the photographing control device 100*c* will be described. Only the differences from the third example embodiment will be described below. A group DB 110*a* is a database for managing members belonging to a group and an authentication record of the group. In the group DB, for each record of group information, for example, one group ID, one or more user IDs, and an authentication record are associated with each other. The authentication record is information indicating that group authentication has succeeded. The authentication record may be a flag or may include, for example but not limited to, information indicating the date and time when and the location where the group authentication has succeeded.

An acquiring unit 120 receives a group authentication request from the facial authentication terminal 300 or the user terminal 400 via the network 500. To rephrase, the acquiring unit 120 acquires a photographed image obtained by a camera of a facial authentication terminal or the like from the facial authentication terminal or the like.

The flow of the group authentication process performed by the photographing control device 100*c* is similar to the flow illustrated in FIG. 10. However, at step S401, the photographing control device 100*c* acquires a group authentication request that includes a photographed image. The photographing control system 600*c* according to the present example embodiment can make an accurate record that all the group members have passed a checkpoint in, for example, a stamp rally.

Sixth Example Embodiment

According to the first to fifth example embodiments, every member of a group needs to register a registration image in advance prior to group registration. However, it is cumbersome for every member of a group to register a registration image in advance. A photographing control system 600*d* according to a sixth example embodiment performs group registration via each user's gesture.

Figure 18:
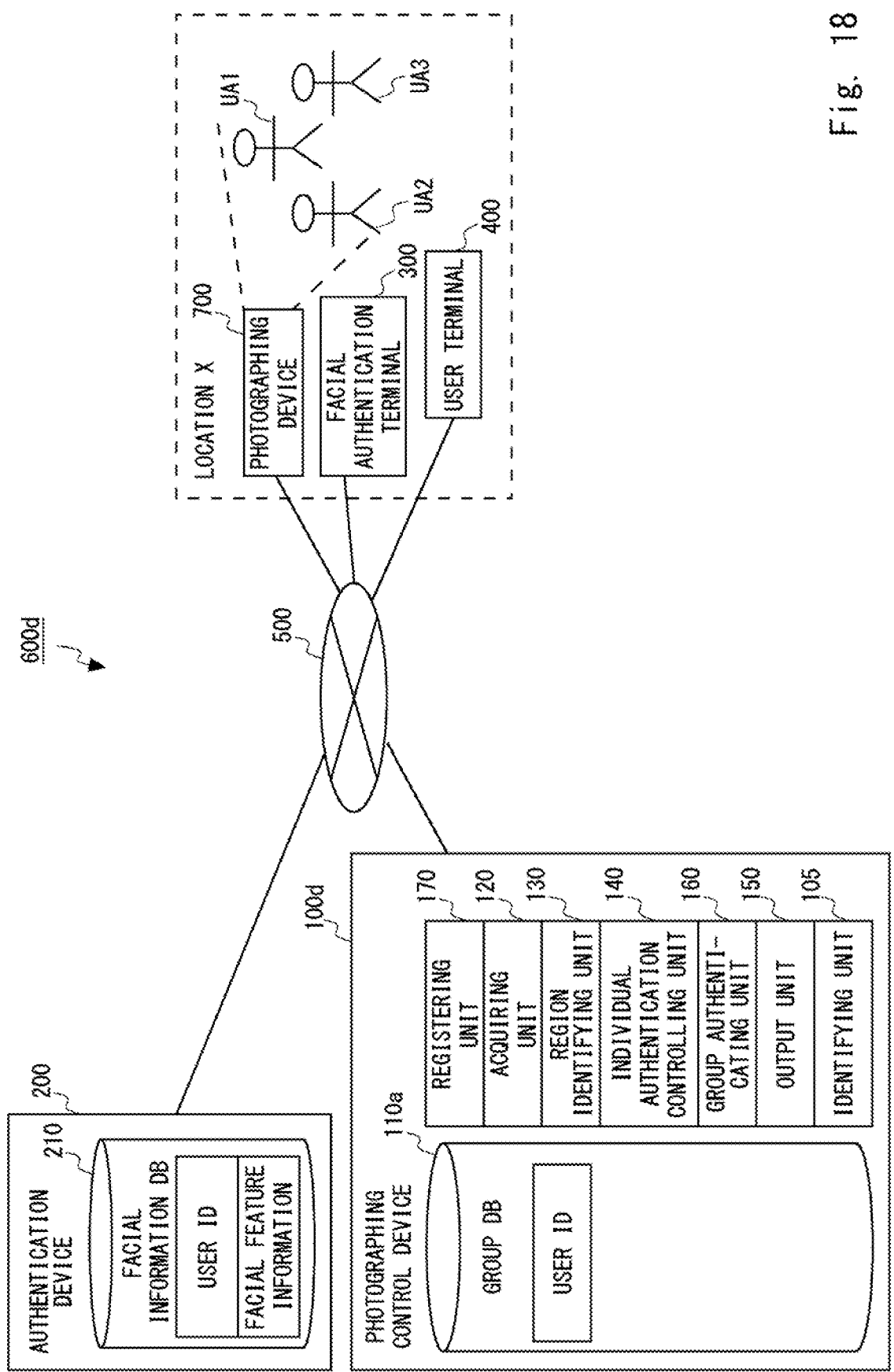
FIG. 18 is a block diagram illustrating a configuration of a photographing control system according to a sixth example embodiment.

FIG. 18 is a block diagram illustrating the photographing control system 600d according to the sixth example embodiment. As compared to the third example embodiment, an identifying unit 105 is added to a photographing control device 100d. A group DB 110a has only the user ID of a user UA1 registered therein, and the user IDs of users UA2 and UA3 have not yet been registered in the group DB 110a. A facial information DB 210 of an authentication device 200 has the user ID and facial feature information of the user UA1 registered therein, and the user IDs and facial feature information of other users have not yet been registered in the facial information DB 210.

An acquiring unit 120 acquires a photographed image for group registration. The acquiring unit 120 may acquire the photographed image for group registration from a facial authentication terminal 300, a user terminal 400, or a photographing device 700. In the case described below, the photographed image includes a plurality of persons. A region identifying unit 130 identifies a plurality of facial regions from a registration image. An individual authentication controlling unit 140 causes the authentication device 200 to perform facial authentication of the identified facial regions.

If the facial authentication of the user UA1 has succeeded, the identifying unit 105 identifies the user UA2 and the user UA3 each making a gesture similar to the gesture of the user UA1 within the photographed image. A gesture is, for example, showing of a peace sign or posing with a raised hand. The identifying unit 105 extracts feature values of postures of the plurality of persons captured in the registration image. The identifying unit 105 may extract motion feature values of motions of the plurality of persons captured in the photographed image. The identifying unit 105 identifies a person whose extracted feature value is similar to the feature value of the user UAL. The identifying unit 105 may identify the type of a gesture based on a feature of the user UA1 and identify a person making the same gesture.

Figure 19:
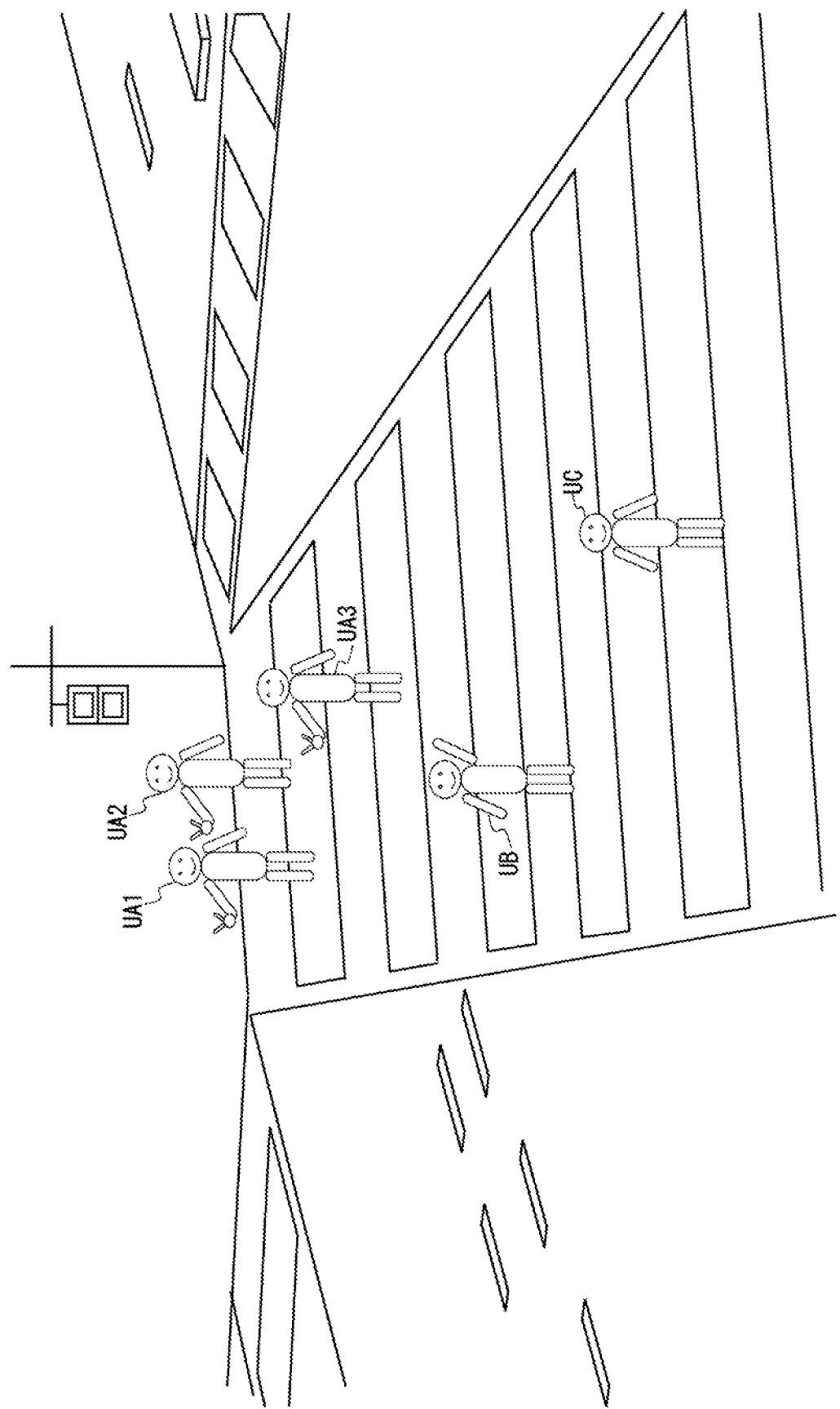
FIG. 19 illustrates an example of a photographed image according to the sixth example embodiment.

FIG. 19 illustrates an example of a photographed image for group registration obtained by the photographing device 700 according to the sixth example embodiment. The registration image includes, as a plurality of persons, users UA1, UA2, UA3, UB, and UC. The user ID of the user UA1 is registered in the group DB 110a. The users UA2 and UA3 are each making the same gesture as the user UAL. The user UB is making a gesture different from the gesture of the user UAL. The user UC is not making any specific gesture. In this case, the identifying unit 105 identifies the users UA2 and UA3.

A registering unit 170 registers facial feature information items generated based on the facial regions of the identified users UA2 and UA3 into the authentication device 200 and registers an association between the user IDs of the users UA2 and UA3 and the user ID of the user UA1 into the group DB 110a. At this point, the registering unit 170 issues a group ID. This configuration makes it possible to easily register a registration image for facial authentication of group members.

Herein, the registering unit 170 may register, among the persons making a gesture similar to the gesture of the user UA1, only a person whose distance from the user UA1 is no greater than a predetermined value into the authentication device 200. This is to keep a person accidentally making the same gesture from being registered as a group member.

Figure 20:
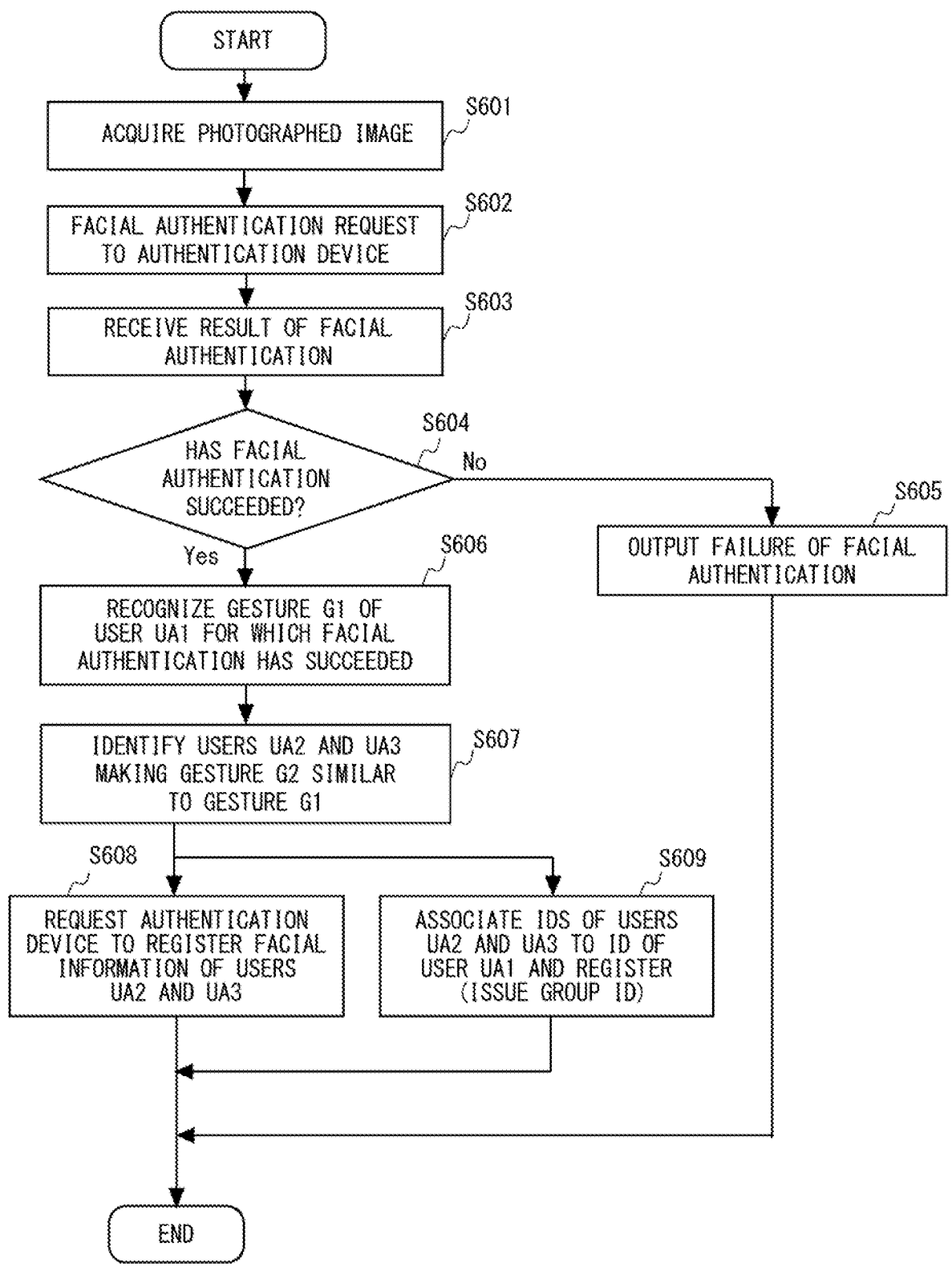
FIG. 20 is a flowchart illustrating a flow of a group registration process according to the sixth example embodiment.

FIG. 20 is a flowchart illustrating an example of a flow of a group registration process according to the present embodiment. The photographing control device 100d first acquires a photographed image for group registration (step S601). Next, the photographing control device 100d requests the authentication device 200 to perform facial authentication of a facial region identified from the photographed image for group registration (step S602). Next, the photographing control device 100d receives the result of the facial authentication (step S603) and determines whether the facial authentication has succeeded (step S604).

If the facial authentication has failed (No at step S604), the photographing control device 100d outputs the failure of the facial authentication (step S605). If the facial authentication has succeeded (Yes at step S604), the photographing control device 100d identifies a gesture g1 of the user UA1 for which the facial authentication has succeeded (step S606). Next, the photographing control device 100d identifies, from the photographed image, the users UA2 and UA3 each making a gesture similar to the gesture g1 (step S607). Lastly, the photographing control device 100d requests the authentication device 200 to register facial information of the users UA2 and UA3 (step S608). In addition, the photographing control device 100d registers an association between the user ID of the user UA1 and the user IDs of the users UA2 and UA3 (step S609). Herein, the photographing control device 100d may transmit the result of the group registration to the user terminal 400.

Figure 21:
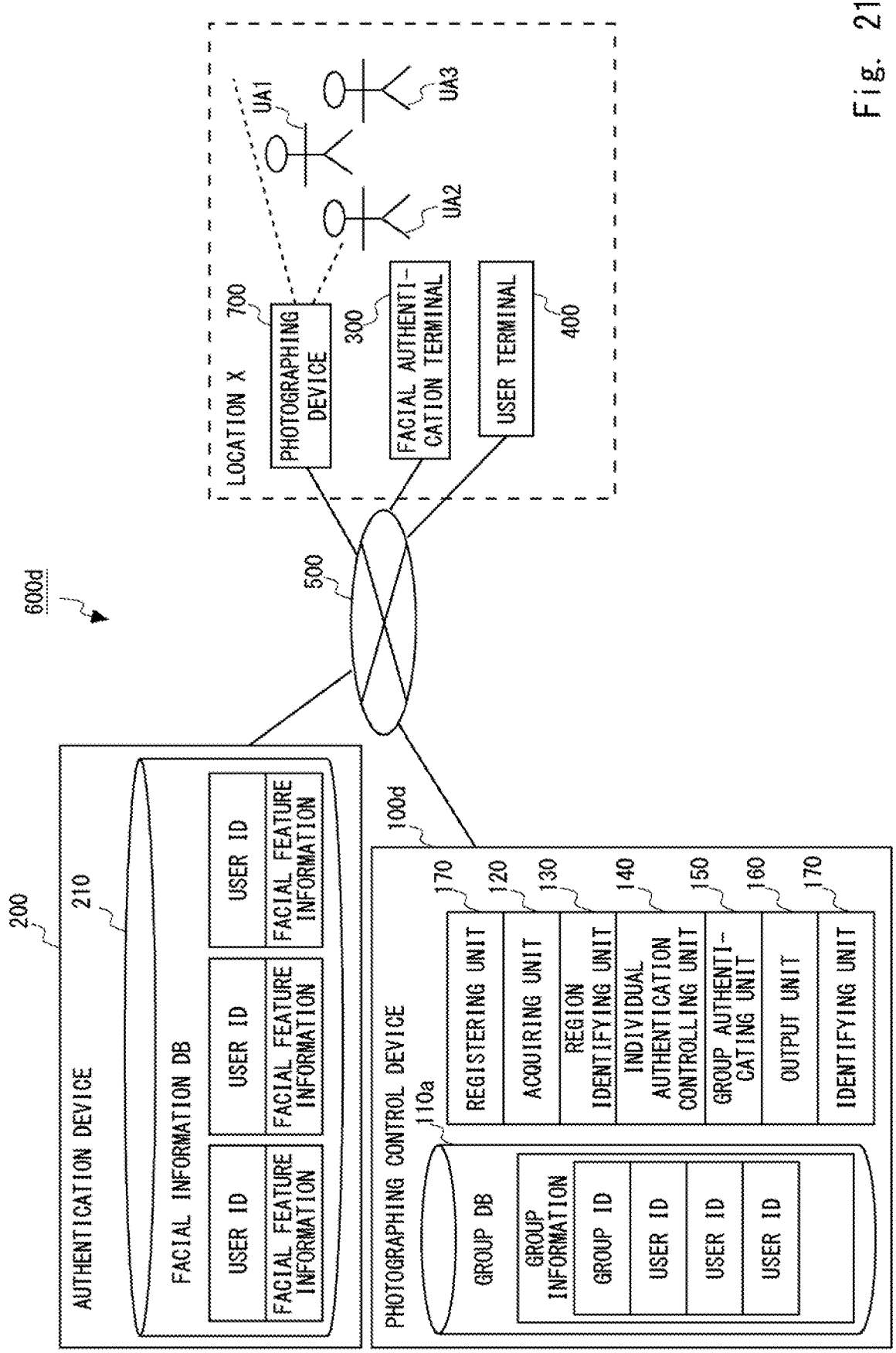
FIG. 21 is a conceptual diagram illustrating a state held after a facial information registration process according to the sixth example embodiment.

FIG. 21 is a conceptual diagram illustrating a state of the photographing control system 600d held after the user IDs of the users UA2 and UA3 have been registered. The facial information of the users UA2 and UA3 is newly registered in the facial information DB 210 of the authentication device 200. The user IDs of the users UA2 and UA3 are newly registered in the group DB 110a of the photographing control device 100d, and the users UA1, UA2, and UA3 are registered as a group in the group DB 110a. The present example embodiment allows the users to perform group registration without registering facial information of all the group members in advance.

The foregoing example embodiments have been described as hardware configurations, but these are not limiting examples. The present disclosure can also be implemented via desired processes by causing a CPU to execute a computer program.

In the foregoing examples, a program can be stored and provided to a computer by use of various types of non-transitory computer-readable media. Non-transitory computer-readable media include various types of tangible storage media. Examples of such non-transitory computer-readable media include a magnetic recording medium (e.g., flexible disk, magnetic tape, hard-disk drive), a magneto-optical recording medium (e.g., magneto-optical disk), a CD-ROM (read-only memory), a CD-R, a CD-R/W, a DVD (digital versatile disc), and a semiconductor memory (e.g., mask ROM, PROM (programmable ROM), EPROM (erasable PROM), flash ROM, RAM (random-access memory)). Meanwhile, a program may be supplied to a computer by use of various types of transitory computer-readable media. Examples of such transitory computer-readable media include an electric signal, an optical signal, and an electromagnetic wave. A transitory computer-readable medium can supply a program to a computer via a wired communication line, such as an electric wire or an optical fiber, or via a wireless communication line.

It is to be noted that the present disclosure is not limited to the foregoing example embodiments, and modifications can be made, as appropriate, within the scope that does not depart from the technical spirit. The present disclosure may also be implemented by combining the example embodiments, as appropriate.

A part or the whole of the foregoing example embodiments can also be expressed as in the following supplementary notes, which are not limiting.

(Supplementary Note 1)

A photographing control device comprising:

storing means for storing identification information of a plurality of persons as a group;

acquiring means for acquiring a photographed image obtained by a predetermined photographing device and capturing multiple persons;

region identifying means for identifying a plurality of facial regions from the photographed image;

individual authentication controlling means for causing an authentication device storing a set of facial feature information items of the plurality of persons to perform facial authentication of each of the identified facial regions by use of the set of facial feature information items; and output means for outputting the photographed image as an output image if facial authentication of each of the facial feature information items of the respective persons belonging to the group has succeeded with regard to any one of the plurality of facial regions.

(Supplementary Note 2)

The photographing control device according to Supplementary Note 1, further comprising group authenticating means for registering an association between a success of group authentication and the group into the storing means if facial authentication of each of the facial feature information items of the respective persons belonging to the group has succeeded with regard to any one of the plurality of facial regions.

(Supplementary Note 3)

The photographing control device according to Supplementary Note 2, wherein the group authenticating means registers the association between the success of the group authentication and the group into the storing means if the facial regions with regard to which the facial authentication of the facial feature information items of the respective persons belonging to the group has succeeded are within a predetermined distance from each other.

(Supplementary Note 4)

The photographing control device according to Supplementary Note 2 or 3, wherein the output means, if facial authentication of a part of the facial feature information items of the respective persons belonging to the group has failed to succeed with regard to any of the plurality of facial regions, provides an output indicating that a person corresponding to the part of the facial feature information items is not included in the photographed image.

(Supplementary Note 5)

The photographing control device according to any one of Supplementary Notes 2 to 4, wherein the storing means stores two or more of the groups, the photographing control device further includes sorting means for sorting each facial region with regard to which the facial authentication has succeeded into any one of the groups to which the corresponding facial feature information item belongs, and the group authenticating means registers, into the storage means, an association between the success of the group authentication and the group in which the facial authentication of all the facial feature information items belonging to the group has succeeded.

(Supplementary Note 6)

The photographing control device according to any one of Supplementary Notes 1 to 4, wherein the storing means stores two or more of the groups, the photographing control device further includes sorting means for sorting each facial region with regard to which the facial authentication has succeeded into any one of the groups to which the corresponding facial feature information item belongs, and generating means for generating, for each group, an edited image obtained by editing the photographed image so as to reduce recognizability of a facial region, among the plurality of facial regions, that does not belong to a specific group, and the output means outputs the edited images corresponding to the respective groups as the output image to terminals corresponding to persons belonging to the respective groups.

(Supplementary Note 7)

The photographing control device according to any one of Supplementary Notes 1 to 6, wherein the acquiring means acquires a second photographed image by the photographing device, the second photographed image capturing a first person included in the plurality of persons and a second person not included in the plurality of persons, the region identifying means identifies a plurality of facial regions from the second photographed image, the individual authentication controlling means causes the authentication device to perform facial authentication of each of the identified facial regions by use of the set of facial feature information items, and the photographing control device further includes identifying means for, if facial authentication has succeeded for the first person, identifying the second person making a gesture similar to a gesture of the first person within the photographed image, and registering means for registering second facial feature information generated based on a facial region of the second person identified within the second photographed image into the authentication device and registering an association between first identification information of the first person and second identification information of the second person into the storing means.

(Supplementary Note 8)

A photographing control device comprising:

storing means for storing a set of facial feature information items of a plurality of persons as a group;

acquiring means for acquiring a photographed image obtained by a predetermined photographing device and capturing multiple persons;

region identifying means for identifying a plurality of facial regions from the photographed image;

individual authentication controlling means for performing facial authentication of each of the identified facial regions by use of the set of facial feature information items; and output means for outputting the photographed image as an output image if facial authentication of each of the facial feature information items of the respective persons belonging to the group has succeeded with regard to any one of the plurality of facial regions.

(Supplementary Note 9)

The photographing control device according to Supplementary Note 8, further comprising a group authenticating means for registering an association between a success of group authentication and the group into the storing means if facial authentication of each of the facial feature information items of the respective persons belonging to the group has succeeded with regard to any one of the plurality of facial regions.

(Supplementary Note 10)

A photographing control system, comprising:
  a photographing control device including storing means configured to store identification information of a plurality of persons as a group;
  an authentication device including storing means configured to store facial feature information items of the plurality of persons and authenticating means configured to perform facial authentication by use of a set of the facial feature information items; and
  a predetermined photographing device,
  wherein the photographing control device is configured to
    acquire a photographed image obtained by the predetermined photographing device and capturing multiple persons,
    identify a plurality of facial regions from the photographed image,
    cause facial authentication of each of the identified facial regions to be performed by use of the set of facial feature information items, and
    output the photographed image as an output image if facial authentication of each of the facial feature information items of the respective persons belonging to the group has succeeded with regard to any one of the plurality of facial regions.

(Supplementary Note 11)

The photographing control system according to Supplementary Note 10, wherein the photographing control device is configured to register an association between a success of group authentication and the group into the storing means if facial authentication of each of the facial feature information items of the respective persons belonging to the group has succeeded with regard to any one of the plurality of facial regions.

(Supplementary Note 12)

A photographing control method executed by a computer storing identification information of a plurality of persons as a group, the photographing control method comprising:
  acquiring a photographed image obtained by a predetermined photographing device and capturing multiple persons;
  identifying a plurality of facial regions from the photographed image;
  causing an authentication device storing a set of facial feature information items of the plurality of persons to perform facial authentication of each of the identified facial regions by use of the set of facial feature information items; and
  outputting the photographed image as an output image if facial authentication of each of the facial feature information items of the respective persons belonging to the group has succeeded with regard to any one of the plurality of facial regions.

(Supplementary Note 13)

A photographing control method executed by a computer storing a set of facial feature information items of a plurality of persons as a group, the photographing control method comprising:
  acquiring a photographed image obtained by a predetermined photographing device and capturing multiple persons;
  identifying a plurality of facial regions from the photographed image;
  performing facial authentication of each of the identified facial regions by use of the set of facial feature information items; and
  outputting the photographed image as an output image if facial authentication of each of the facial feature information items of the respective persons belonging to the group has succeeded with regard to any one of the plurality of facial regions.

(Supplementary Note 14)

A non-transitory computer-readable medium storing a photographing control program that causes a computer storing identification information of a plurality of persons as a group to execute:
  a process of acquiring a photographed image obtained by a predetermined photographing device and capturing multiple persons;
  a process of identifying a plurality of facial regions from the photographed image;
  a process of causing an authentication device storing a set of facial feature information items of the plurality of persons to perform facial authentication of each of the identified facial regions by use of the set of facial feature information items; and
  a process of outputting the photographed image as an output image if facial authentication of each of the facial feature information items of the respective persons belonging to the group has succeeded with regard to any one of the plurality of facial regions.

(Supplementary Note 15)

A non-transitory computer-readable medium storing a photographing control program that causes a computer storing a set of facial feature information items of a plurality of persons as a group to execute:
  a process of acquiring a photographed image obtained by a predetermined photographing device and capturing multiple persons;
  a process of identifying a plurality of facial regions from the photographed image;
  a process of performing facial authentication of each of the identified facial regions by use of the set of facial feature information items; and
  a process of outputting the photographed image as an output image if facial authentication of each of the facial feature information items of the respective persons belonging to the group has succeeded with regard to any one of the plurality of facial regions.

Thus far, the invention of the present application has been described with reference to some example embodiments (and examples). The invention of the present application, however, is not limited to the foregoing example embodiments (and examples). Various modifications that a person skilled in the art can appreciate can be made to the configurations and the details of the invention of the present application within the scope of the invention of the present application.

REFERENCE SIGNS LIST 100, 100a, 100b, 100c, 100d PHOTOGRAPHING CONTROL DEVICE
110 STORAGE UNIT
110a GROUP DB
120 ACQUIRING UNIT
130 REGION IDENTIFYING UNIT
140 INDIVIDUAL AUTHENTICATION CONTROLLING UNIT
150 OUTPUT UNIT

160 GROUP AUTHENTICATING UNIT
170 REGISTERING UNIT
180 SORTING UNIT
190 GENERATING UNIT
105 IDENTIFYING UNIT
200 AUTHENTICATION DEVICE
210 FACIAL INFORMATION DB
220 FACE DETECTING UNIT
230 FEATURE POINT EXTRACTING UNIT
240 REGISTERING UNIT
250 AUTHENTICATING UNIT
300 FACIAL AUTHENTICATION TERMINAL
310 CAMERA
320 STORAGE UNIT
330 COMMUNICATING UNIT
340 DISPLAY UNIT
350 CONTROLLING UNIT
351 PHOTOGRAPHING UNIT
352 REGISTERING UNIT
353 GROUP IMAGE REQUESTING UNIT
400 USER TERMINAL
410 CAMERA
420 STORAGE UNIT
430 COMMUNICATING UNIT
440 DISPLAY UNIT
450 CONTROLLING UNIT
451 PHOTOGRAPHING UNIT
452 REGISTERING UNIT
453 GROUP IMAGE REQUESTING UNIT
500 NETWORK
600, 600a, 600b, 600c, 600d PHOTOGRAPHING CONTROL SYSTEM
700 PHOTOGRAPHING DEVICE

What is claimed is:

1. A photographing control device comprising:
at least one memory storing instructions and identification information of a plurality of persons as a group; and
at least one processor configured to execute the instructions to:
acquire a photographed image obtained by a predetermined photographing device and capturing multiple persons;
identify a plurality of facial regions from the photographed image;
cause an authentication device storing a set of facial feature information items of the plurality of persons to perform facial authentication of each of the identified facial regions by use of the set of facial feature information items; and
output the photographed image as an output image if facial authentication of each of the facial feature information items of the respective persons belonging to the group has succeeded with regard to any one of the plurality of facial regions.

2. The photographing control device according to claim 1, wherein the at least one processor is further configured to execute the instructions to:
register an association between a success of group authentication and the group into the at least one memory if facial authentication of each of the facial feature information items of the respective persons belonging to the group has succeeded with regard to any one of the plurality of facial regions.

3. The photographing control device according to claim 2, wherein the at least one processor is further configured to execute the instructions to:
register the association between the success of the group authentication and the group into the at least one memory if the facial regions with regard to which the facial authentication of the facial feature information items of the respective persons belonging to the group has succeeded are within a predetermined distance from each other.

4. The photographing control device according to claim 2, wherein the at least one processor is further configured to execute the instructions to:
if facial authentication of a part of the facial feature information items of the respective persons belonging to the group has failed to succeed with regard to any of the plurality of facial regions, provide an output indicating that a person corresponding to the part of the facial feature information items is not included in the photographed image.

5. The photographing control device according to claim 2, wherein
the at least one memory is configured to store two or more of the groups, and
the at least one processor is further configured to execute the instructions to:
sort each facial region with regard to which the facial authentication has succeeded into any one of the groups to which the corresponding facial feature information item belongs, and
register, into the at least one memory, an association between the success of the group authentication and the group in which the facial authentication of all the facial feature information items belonging to the group has succeeded.

6. The photographing control device according to claim 1, wherein
the at least one memory is configured to store two or more of the groups, and
the at least one processor is further configured to execute the instructions to:
sort each facial region with regard to which the facial authentication has succeeded into any one of the groups to which the corresponding facial feature information item belongs, and
generate, for each group, an edited image obtained by editing the photographed image so as to reduce recognizability of a facial region, among the plurality of facial regions, that does not belong to a specific group, and
output the edited images corresponding to the respective groups as the output image to terminals corresponding to persons belonging to the respective groups.

7. The photographing control device according to claim 1, wherein the at least one processor is further configured to execute the instructions to:
acquire a second photographed image by the photographing device, the second photographed image capturing a first person included in the plurality of persons and a second person not included in the plurality of persons,
identify a plurality of facial regions from the second photographed image,
cause the authentication device to perform facial authentication of each of the identified facial regions by use of the set of facial feature information items,
if facial authentication has succeeded for the first person, identify the second person making a gesture similar to a gesture of the first person within the photographed image, and register second facial feature information generated based on a facial region of the second person identified within the second photographed image into the authentication device and register an association between first identification information of the first person and second identification information of the second person into the at least one memory.

8. A photographing control method executed by a computer storing identification information of a plurality of persons as a group, the photographing control method comprising:

acquiring a photographed image obtained by a predetermined photographing device and capturing multiple persons;

identifying a plurality of facial regions from the photographed image;

causing an authentication device storing a set of facial feature information items of the plurality of persons to perform facial authentication of each of the identified facial regions by use of the set of facial feature information items; and outputting the photographed image as an output image if facial authentication of each of the facial feature information items of the respective persons belonging to the group has succeeded with regard to any one of the plurality of facial regions.

9. A non-transitory computer-readable medium storing a photographing control program that causes a computer storing identification information of a plurality of persons as a group to execute:

a process of acquiring a photographed image obtained by a predetermined photographing device and capturing multiple persons;

a process of identifying a plurality of facial regions from the photographed image;

a process of causing an authentication device storing a set of facial feature information items of the plurality of persons to perform facial authentication of each of the identified facial regions by use of the set of facial feature information items; and a process of outputting the photographed image as an output image if facial authentication of each of the facial feature information items of the respective persons belonging to the group has succeeded with regard to any one of the plurality of facial regions.

* * * * *